Aug. 25, 1959 M. ARTZT 2,901,538

FREQUENCY MODULATION SYSTEM

Filed June 19, 1958 8 Sheets-Sheet 1

INVENTOR.
MAURICE ARTZT
BY Charles H. Brown
ATTORNEY

Aug. 25, 1959 M. ARTZT 2,901,538

FREQUENCY MODULATION SYSTEM

Filed June 19, 1958 8 Sheets-Sheet 2

INVENTOR.
MAURICE ARTZT
BY
Charles H. Brown
ATTORNEY

INVENTOR.
MAURICE ARTZT
BY
Charles H. Brown
ATTORNEY

Aug. 25, 1959 M. ARTZT 2,901,538

FREQUENCY MODULATION SYSTEM

Filed June 19, 1958 8 Sheets-Sheet 4

MAURICE ARTZT
INVENTOR.
BY Charles H. Brown
ATTORNEY

INVENTOR.
MAURICE ARTZT
BY
Charles H. Brown
ATTORNEY

Aug. 25, 1959 M. ARTZT 2,901,538

FREQUENCY MODULATION SYSTEM

Filed June 19, 1958 8 Sheets-Sheet 6

INVENTOR.
MAURICE ARTZT
BY Charles H. Brown
ATTORNEY

Aug. 25, 1959 M. ARTZT 2,901,538

FREQUENCY MODULATION SYSTEM

Filed June 19, 1958 8 Sheets-Sheet 7

INVENTOR.
MAURICE ARTZT
BY Charles H. Brown
ATTORNEY

Aug. 25, 1959 M. ARTZT 2,901,538

FREQUENCY MODULATION SYSTEM

Filed June 19, 1958 8 Sheets-Sheet 8

INVENTOR.
MAURICE ARTZT
BY
Charles H. Brown
ATTORNEY

United States Patent Office 2,901,538

Patented Aug. 25, 1959

2,901,538

FREQUENCY MODULATION SYSTEM

Maurice Artzt, Princeton, N.J., assignor to Radio Corporation of America, a corporation of Delaware Application June 19, 1958, Serial No. 743,216

30 Claims. (Cl. 178—6)

This invention relates to frequency modulation systems. Particularly, the invention relates to a system in which a frequency modulated (FM) carrier of near sine wave output and wide frequency swing is produced, the change or shift in frequency being sufficiently rapid to allow for modulating signals approaching the carrier in actual frequency. Although not limited in application thereto, a variable velocity facsimile system will be described using the frequency modulation system of the invention.

There are a number of uses of frequency modulation or frequency shift keying where the frequency swing or shift is comparable to the maximum information or keying frequency of the modulating signals. These uses include facsimile, 5 or 7 unit codes and similar communication systems. Apparatus limitations have generally restricted the generation of such signals at the transmitter to some form of reactance tube modulation of an inductance-capacitance oscillator at some high frequency where the necessary frequency swing may be obtained. The resulting signal is heterodyned with a fixed frequency oscillator and the beat frequency detected and filtered to place the FM wave in the desired band. The overall modulating system is therefor complicated, and is usually troubled by warm-up drifts and associated difficulties in maintaining proper adjustment.

A further difficulty encountered in the application of known FM systems is the limits on the modulating frequency with respect to the carrier. In normal FM detection two pieces of information or bits are obtained per cycle, one for each half cycle of the carrier. When an FM wave is passed through a discriminator or slope filter so that it may be amplitude detected, these two bits appear as varying amplitudes of the half cycle components. If the received signal has been amplitude limited to obtain a square wave, the two crossovers at zero voltage per cycle will provide the two pieces of information as a varying width of time per half cycle. In either case, or a combination of the two, the carrier must always be considerably greater than the modulating frequency for there to be enough bits of information to reconstruct the signal on detection. The speed of transmission is thus limited according to the carrier frequency in a particular application.

For example, when an FM subcarrier is used to transmit facsimile signals, the black and white limit frequencies of the swing are usually separated by an amount approximately equal to the maximum keying frequency. Thus, in one particular facsimile equipment, the maximum video or keying frequency is 625 cycles per second, and the FM limit frequencies for white and black are 1600 and 2200 cycles. The lowest frequency of 1600 cycles is approximately 2.5 times the highest modulating frequency, so at least 5 bits of information are obtained out of the detector to define the highest frequency it is required to transmit. If it is desired to transmit this wave over a 300 to 3000 cycle voice frequency telephone line, lower distortion would be obtained if the carrier swing was 800 to 1400 cycles per second instead of 1600 to 2200 cycles per second, but the detection system would deliver only 2½ bits of information per keying cycle, and poor copy detail would be the result. The phase detection system to be described will in this case deliver 5 bits of signal information per cycle while operating within the 800 to 1400 cycle swing.

A general object of the invention is to provide an improved frequency modulation system, avoiding the limitations as to apparatus and modulating frequency encountered in previously known systems.

Another object is to provide an improved frequency modulation system by which a carrier of near sine wave configuration and wide frequency swing is produced, the change or swing in frequency being sufficient rapid to allow for modulating signals aproaching the carrier in actual frequency.

A further object is to provide an improved phase detection system for detecting the modulating signals in a frequency modulated carrier in which the rate of change or shift in frequency is sufficiently rapid to allow the modulating signals to approach the carrier in actual frequency.

A still further object is to provide an improved frequency modulation system including a frequency modullated sawtooth oscillator and wave shaping means for shaping the modulated output signal of the oscillator into a sine wave with less than 2 percent harmonic distortion at all frequencies.

A still further object is to provide an improved variable velocity facsimile system capable of a greater transmission speed for a given carrier frequency than is possible using known systems.

A still further object is to provide an improved variable velocity facsimile system in which a near sine wave, frequency modulated signal is produced from a signal developed by a facsimile scanning or pick-up apparatus such that the rate of change or shift in frequency is rapid enough to permit the modulating signals to approach the carrier in actual ferquency, and in which a phase detection system is provided for detecting the modulating signal in the received frequency modulated signal to operate a facsimile recording apparatus.

According to the objects of the invention, a frequency modulated generator is provided in one embodiment of the invention including a sawtooth oscillator. The oscillator includes a normally conducting current conducting device and a capacitor charged by current furnished by the current conducting device. When the charge across the capacitor reaches a given value, the capacitor is automatically discharged to produce a single sawtooth wave or cycle of oscillation. The capacitor immediately starts charging again in response to the charging current towards the formation of the next cycle, and so on. The input or modulating signal as supplied, for example, by a facsimile scanning or pick-up apparatus is fed to the current conducting device. The level of current conduction by the current conducting device is varied as a function of the amplitude of the input signal, resulting in the charging current to the capacitor also varying as a function of the amplitude of the input signal. The slope of each sawtooth wave developed across the capacitor is varied according to the changes in the amplitude of the input signal. The amplitude peak to peak value of the sawtooth voltage is constant at the given value regardless of the number of times or amount the slope is changed during a cycle.

By the above action, each cycle of oscillation or sawtooth wave is modulated a given number of times and in amounts determined according to the number and amount of the changes in the amplitude of the modulating signal occurring during that cycle. The modulation of the capacitor charging current causes the change or swing in the frequency of the sawtooth wave output signal or carrier (by the change in the slope of the sawtooth waves) to be sufficiently rapid to allow for modulating signals approaching the carrier in actual frequency. More than two bits of information may be obtained per carrier cycle, so that the information rate is increased without a proportionate increase in total bandwidth.

A frequency modulated generator is provided which allows a frequency swing of 5 or 10 to 1 and even higher if desired, and the output wave is generated at the fundamental frequency without heterodyning. As no inductance-capacitance circuits are involved, the frequency changes in the output wave caused by the changes in the modulating signal are practically instantaneous. The frequency modulated sawtooth wave output signal of the generator is applied to a wave shaping circuit arrangement that forms the output signal into a sine wave with less than 2 percent harmonic distortion at all frequencies. The need for filters is avoided, and the output wave or signal remains in phase and without the time delay errors that filters introduce. Avoiding the use of filters also removes the filter-slope limitations on the rate of change of generator frequency.

The resulting sine wave output signal is fed over a suitable radio link or land line to a receiver. The receiver includes a phase detection system arranged according to the invention. In principle, the detector extracts the timing information of the zero voltage crossovers as in the usual FM detector but, in addition, adds additional timing information according to the number of bits of information to be recovered from each cycle of the received signal. For example, it may be assumed that the frequency modulated generator is operated in response to the modulating or input signal as above such that each ¼ cycle of a sawtooth wave produced corresponds to a bit of information. That is, the slope for each ¼ cycle of each sawtooth wave is determined according to the amplitude of the modulating signal at that instant in time. In addition to the first set of timing information provided at 0° and 180° positions of each cycle of the received sine wave signal, the detector adds a second set of timing information for the peaks at the 90° and 270° positions of each cycle. The information in the second set is not a repetition of that in the first set, and actually represents new information. The two sets of information are added together by means of limiters, differentiators and pulse rectifiers, and four separate time intervals are obtained per carrier cycle, each interval representing one of the four quadrants of the cycle. The resulting output signal including the four separate time intervals in the form of a series of spaced pulses is fed from the detector to suitable signal reproducing apparatus. If the modulating signal is supplied to the frequency modulated generator from a facsimile pick-up apparatus, the output signal of the detector circuit is fed to means for operating a facsimile recording apparatus, and so on.

The frequency modulation system of the invention will be described in connection with a variable velocity facsimile system. However, the invention is not to be considered as limited to this particular application. In the variable velocity facsimile system, a signal is fed from a conventional phototube pick-up means to the current conducting device in the sawtooth oscillator of the frequency modulated generator. The amplitude of the modulating signal produced by the phototube varies according to the intensity of the light reflected from an image scanned by a beam of light supplied, for example, by a flying spot scanner. The frequency modulated signal is fed from the sawtooth oscillator in the generator to a given number of separate pulse producing circuits each arranged to produce a pulse upon the slope of each sawtooth wave produced reaching a potential representing a given phase angle, the pulse producing circuits being set to operate at different phase angles of the sawtooth waves. That is, each of the pulse producing circuits is arranged to produce a pulse when the sawtooth wave reaches an amplitude representing a particular phase angle. These trigger amplitude settings are spaced linearly along the sawtooth amplitude so that a given number of pulses are produced for each cycle of the carrier frequency, and equally spaced in angle (not necessarily equally spaced in time unless the frequency is constant throughout the cycle). By this action, pulses are produced corresponding in number to the number of pulse circuits for each cycle of oscillation or sawtooth wave, the time interval between succeeding pulses produced by the pulse circuits being a function of any change in the slope of the sawtooth wave brought about by a change in the amplitude of the modulating signal supplied by the phototube at that instant in time.

The output pulses from the separate pulse producing circuits are added together in a pulse-to-step function integrator to produce a step wave which is fed to a conventional horizontal sweep amplifier. The amplifier operates to provide the horizontal deflection for the flying spot scanner, and so on. A step function modulating signal is therefore produced by the phototube. Since the time interval between each two succeeding pulses produced by the pulse circuits and fed to the integrator is a function of any change in the slope of the sawtooth waves, the scanning rate or speed is continually varied according to the varying intensity of light picked up by the phototube, providing a variable velocity facsimile system. The sine wave output signal produced at the transmitter from the frequency modulated sawtooth wave has a number of bits of information per cycle corresponding to the number of pulse circuits used.

The phase detection system at the receiver extracts timing information in response to the sine wave signal received in accordance with the number of bits of information to be recovered per cycle. The bits of information recovered for each cycle are added together to produce a series or train of pulses spaced according to the timing information detected. The train of pulses is fed to a pulse-to-step function integrator which produces and applies a corresponding step wave to a horizontal sweep amplifier. The amplifier provides the horizontal deflection for a flying spot facsimile recorder arranged to reproduce the original image. Means are provided at the transmitter location to produce and transmit with the sine wave output signal a control pulse for synchronizing the operation of the flying spot recorder at the receiver with that of the flying spot scanner at the transmitter.

A more detailed description of the invention will now be given in connection with the accompanying drawing in which:

Figure 1 is a block diagram of a variable velocity facsimile system including a frequency modulation system arranged according to the invention.

Figs. 2*a* and 2*b* are circuit diagrams showing one embodiment of the transmitter portion of the variable velocity facsimile system given in the block diagram of Figure 1.

Figure 1:
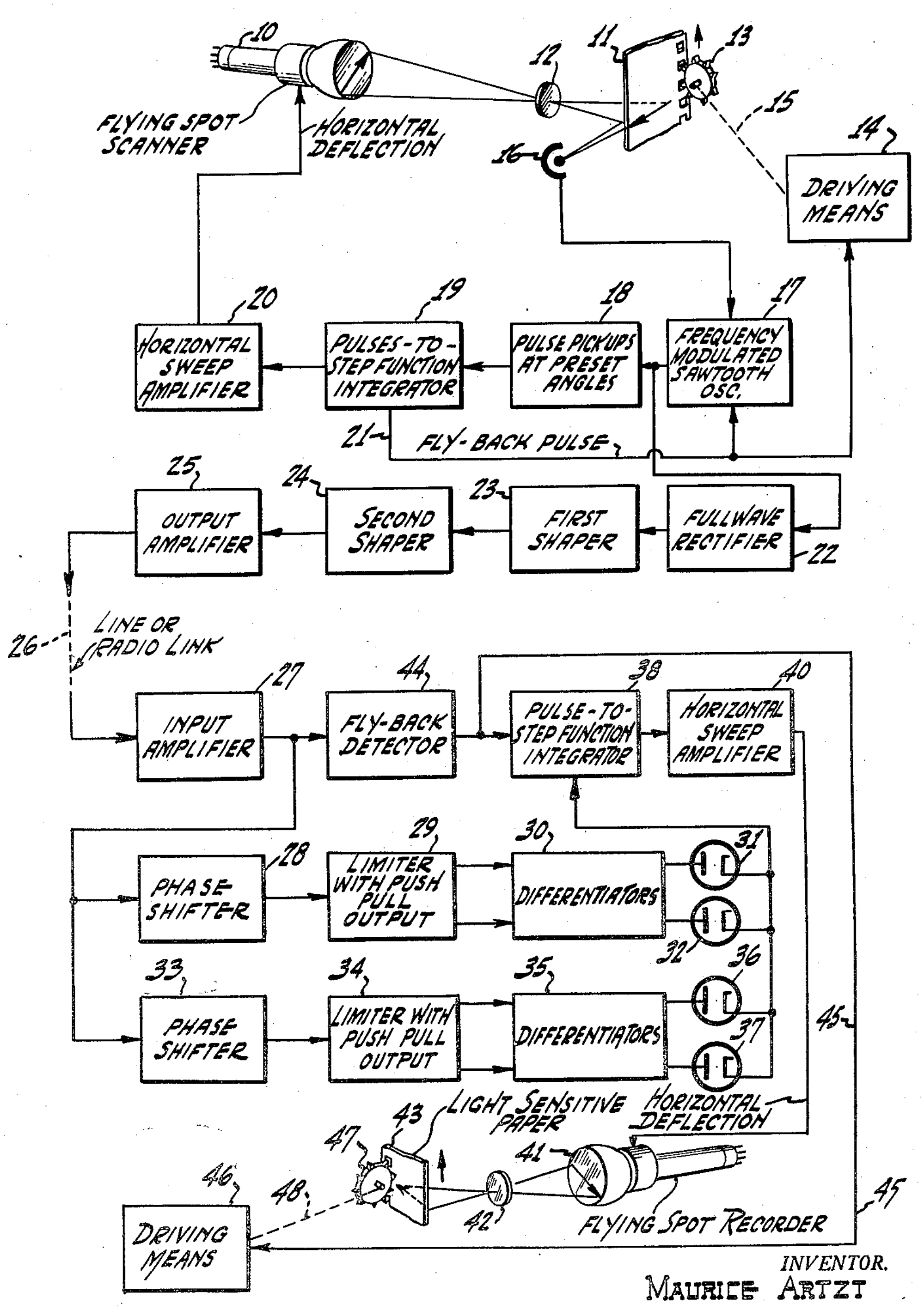
Figure 6A:
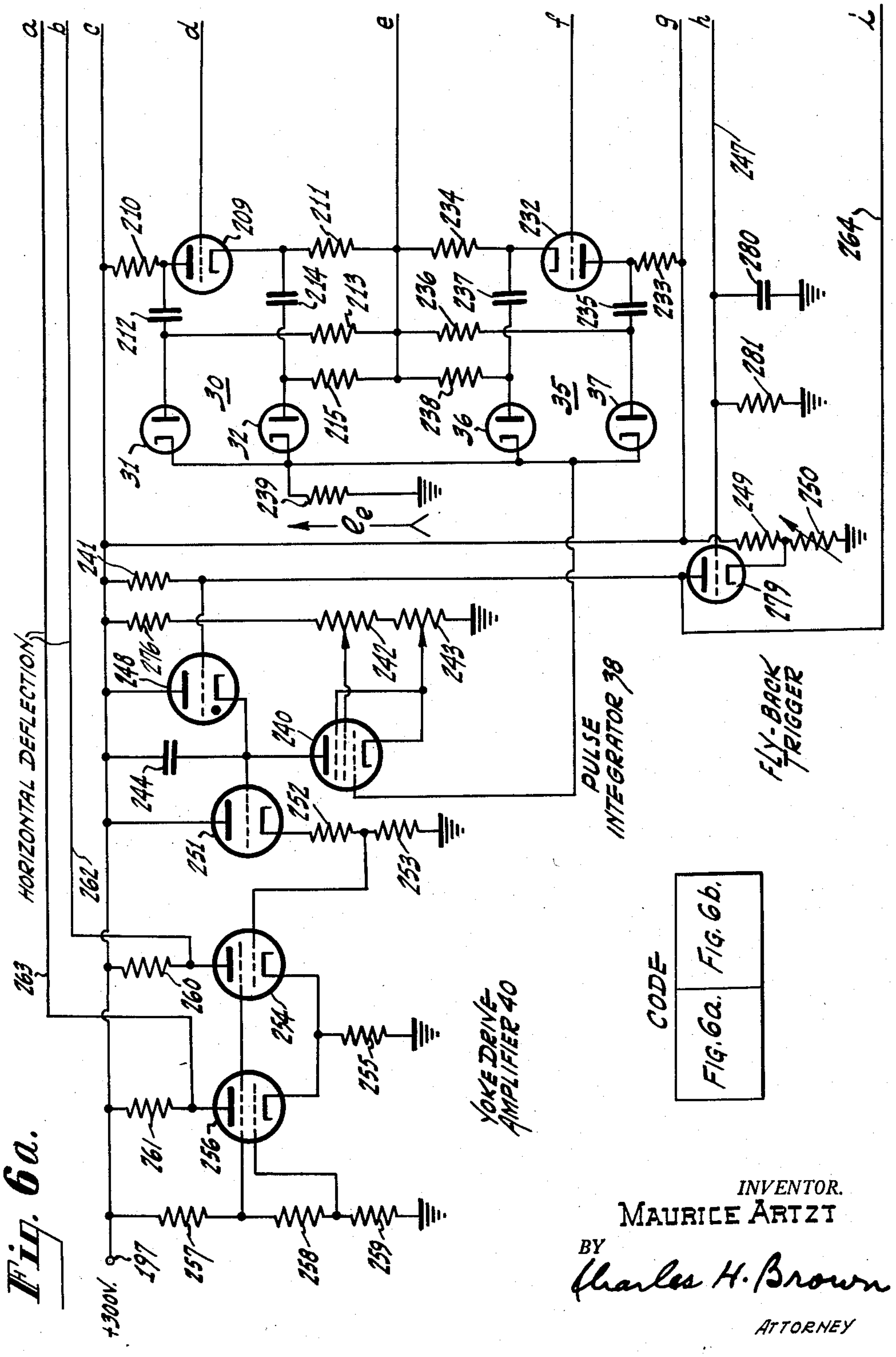
Figure 6B:
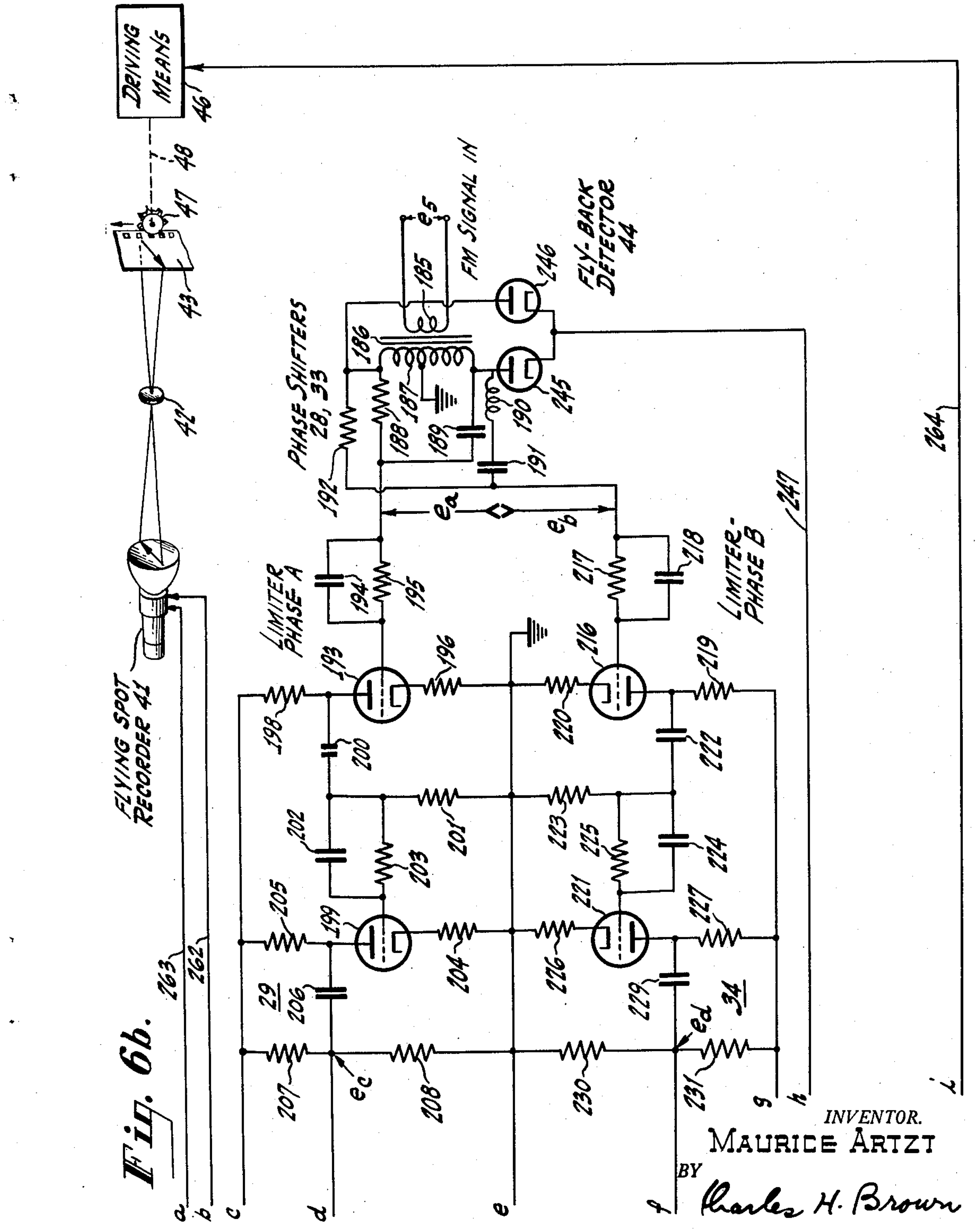

Figs. 6*a* and 6*b* are circuit diagrams of one embodiment of the receiver portion of the variable velocity facsimile system given in the block diagram of Figure 1.

Figure 7:
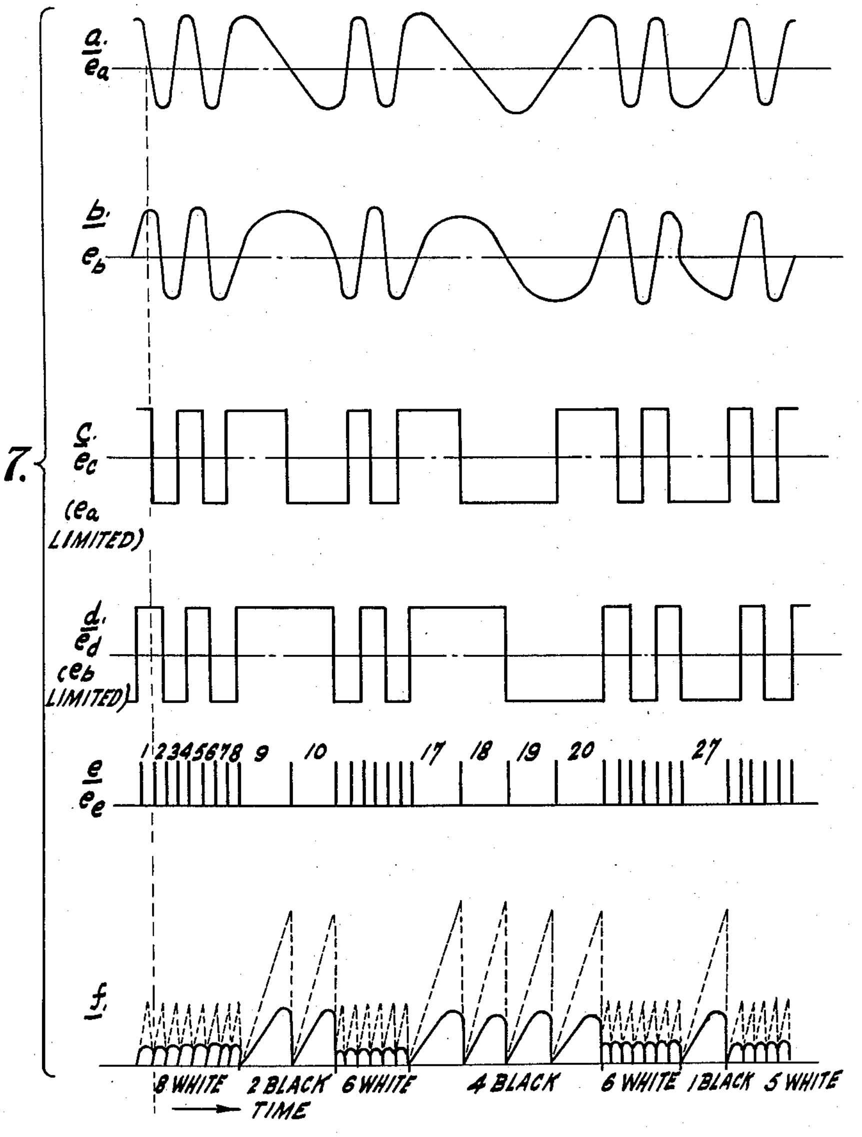

Figure 7 is a series of curves to be used in describing the operation of the circuit diagram given in Figure 6.

Figure 8:
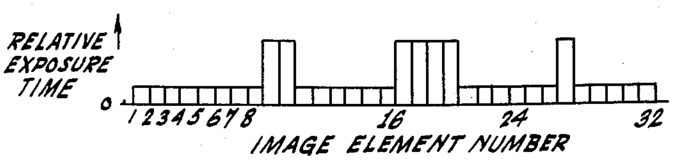

Figure 8 is a chart comparing relative exposure times for image elements at the facsimile recorder, assuming the occurrence of signals as shown in the curves of Figure 7.

Figure 9:
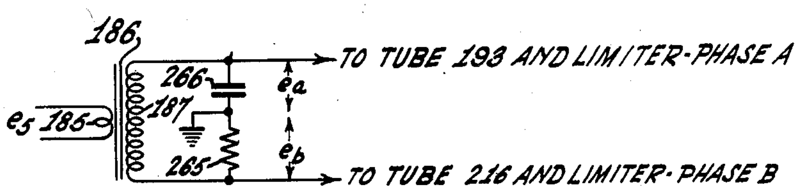

Figure 9 is a circuit diagram of a modification of the phase shifting circuit arrangement included in the circuit diagram given in Figure 6.

Figure 10:
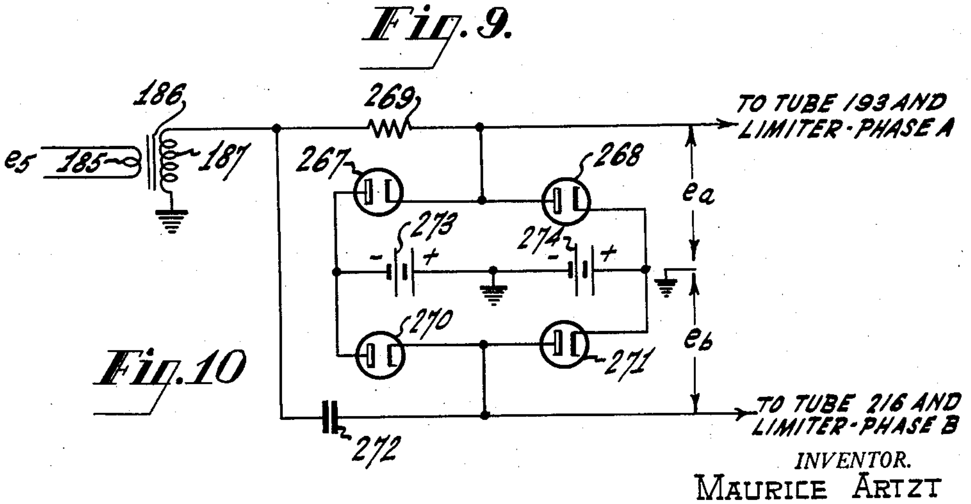

Figure 10 is a circuit diagram of a further modifica-

The phase detection circuit includes two similar parallel paths. The first path includes a phase shifter 28, limiter 29, differentiator 30 and a pair of rectifiers 31, 32 arranged as a full wave rectifier. The second path includes a phase shifter 33, limiter 34, differentiator 35 and a pair of rectifiers 36, 37 arranged as a full wave rectifier. The incoming sine wave carrier is applied to the inputs of the two phase shifters 28, 33. The phase shifters 28, 33 are arranged so that the angular difference between the signal at the output of phase shifter 28 and that at the output of phase shifter 33 is substantially 90° for all frequencies in the band used for the facsimile signal. The peaks of one output signal occur in time at the zero voltage crossovers of the other output signal. The output signal of the phase shifter 28 is amplified and limited by limiter 29 to form a high voltage square wave with accurately spaced transition points. A phase inverter follows the limiter 29 so that both positive and negative forms of the square wave are applied to the differentiators 30. The two inverter outputs are differentiated and full wave rectified by rectifiers 31, 32 so that a positive pulse is obtained for each transition point of the square wave.

The output signal of the second phase shifter 33 is processed in the same manner. The output signal is amplified and limited by limiter 34 to provide a high voltage square wave with accurately spaced transition points. Positive and negative forms of the square wave are differentiated by the differentiators 35 and full wave rectified by rectifiers 36, 37. A positive pulse is obtained for each transition point of the square wave developed over the second path. The pulses from both phases at the outputs of the rectifiers 31, 32, 36 and 37 are added together, resulting in four pulses per carrier cycle being obtained. There is a pulse for each 90° of the carrier, the time spacing between each two pulses representing the duration time for that ¼ cycle of the carrier frequency. The pulses are accurately spaced in time so as to interlace correctly.

The series of spaced pulses added together at the outputs of rectifiers 31, 32, 36 and 37 is fed to a pulse-to-step function integrator 38 similar to the integrator 19. The integrator 38 is triggered to produce a stair step wave similar in appearance to the stair step wave appearing at the output of integrator 19. That is, the spacing of the pulses applied to the integrator 38 is the same as the spacing of the corresponding pulses applied to the integrator 19. The stair step wave output of the integrator 38 is applied to the horizontal sweep amplifier 40 which functions in response thereto to apply the horizontal deflection to the proper coils of the yoke of a flying spot type of cathode ray recorder 41. The recorder 41 operates with a suitable optical arrangement represented by a lens 42 to sweep a beam or spot of light across a light sensitive paper 43, as indicated by the arrows. The motion of the scanning beam of the recorder 41 duplicates the step sweep of the scanner 10. The height of each step of the stair step wave produced by the integrator 38 is always the same and corresponds to the height of the steps of the stair step wave produced by the integrator 19. The scanning beam of the recorder 41 is stepped across the paper 43 in exactly the same manner as the scanning beam of scanner 10 is stepped across the copy 11. The exposure time of the light sensitive recording paper 43 (the time that the scanning beam of recorder 41 remains at each position) is equal to the time difference between successive pulses applied to the integrator 38. For white elements, the pulses applied to the integrator 19 are spaced relatively close together in time, resulting in minimum exposure time of the paper 43 at such positions. For black elements, the pulses are spaced a maximum distance apart, resulting in the maximum exposure time of the paper 43 at such positions. The system is linear for half tones, since any intermediate gray frequency results in exposure times proportionate to that value of gray.

The incoming sine wave carrier wave is applied from the output of amplifier 27 to a fly-back detector 44. The detector 44 detects the fly-back signal received at the end of each scanning line and triggers the integrator 38 to return the stair step output wave thereof to the original level. This action causes the beam produced by the recorder 41 to return to starting position such that the beam is readied to sweep the next scanning line. At the same time, the detector 44 forwards a control signal via lead 45 to a driving means 46 similar to driving means 14. The driving means 46 operates a wheel 47 or other apparatus similar to the wheel 13 via mechanical connection 48, indicated by the dotted line, to step up the paper 43 to the next scanning line.

A feature of the invention is that no frequency standards are used at either end of the facsimile system. If the FM wave end or limit frequencies drift, the exposure time per element changes but no mismatch in synchronism occurs. An image is reproduced on the paper 43 which is a duplicate of the image on the copy 11.

Figure 2A:
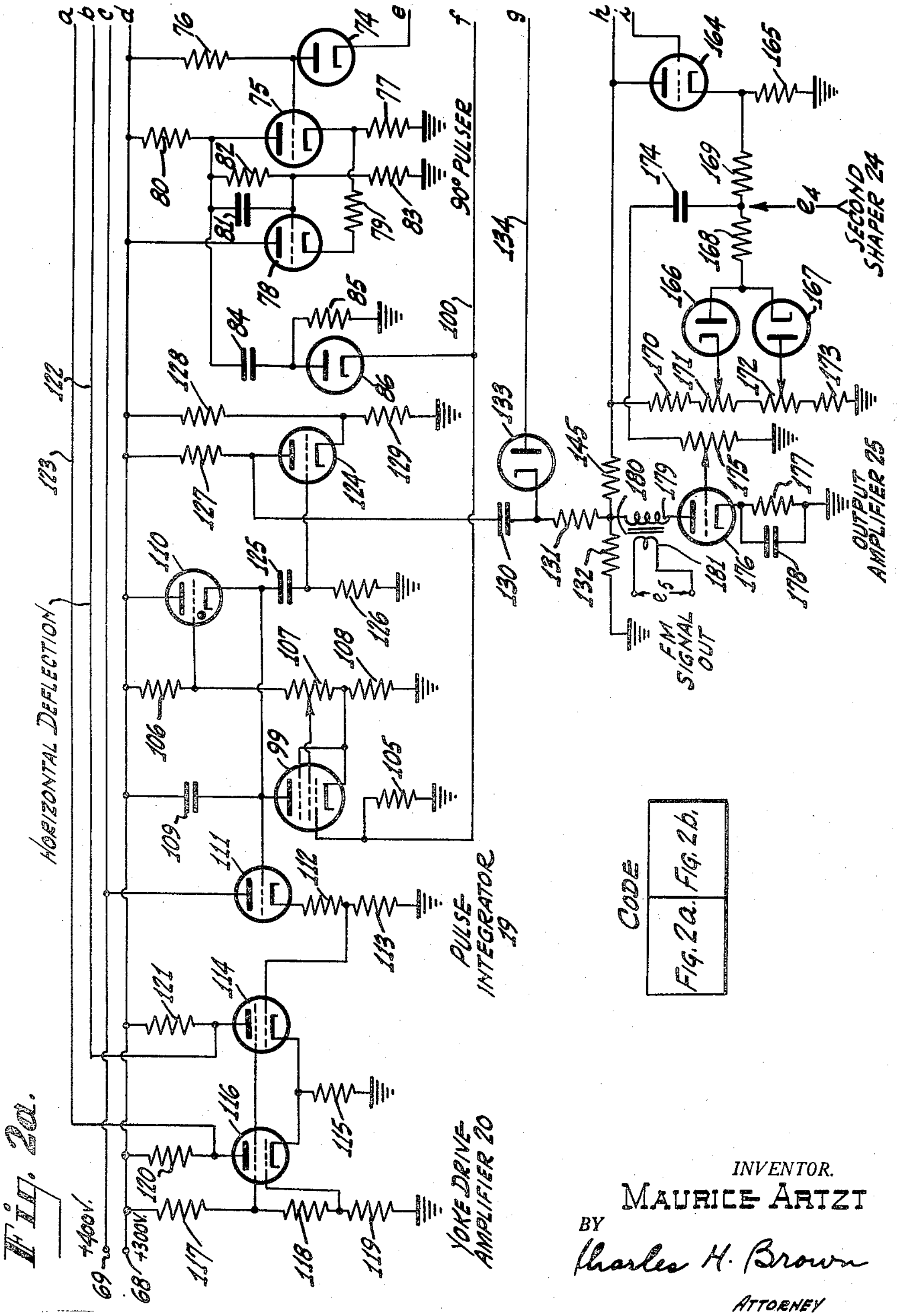
Figure 2B:
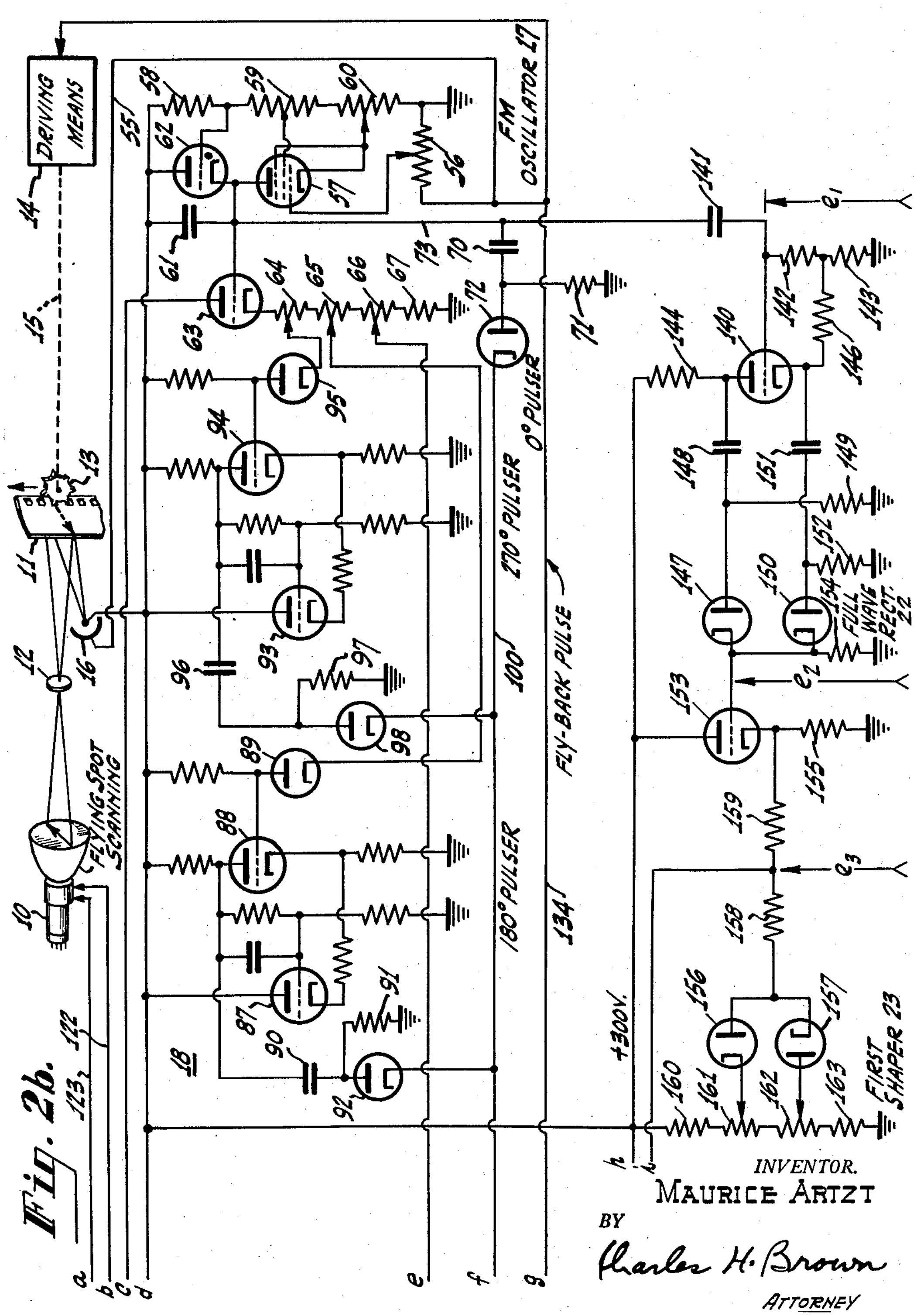

A circuit diagram of one embodiment of the transmitter portion of the variable velocity facsimile system given in the block diagram of Fig. 1 is shown in Figure 2. Two requirements must be satified in the variable frequency oscillator 17 to arrive at the final FM wave desired. These are that the frequency determining component of the oscillator 17 must have no stored energy, so that it can be readily shifted without causing transients. Further, the output wave of this oscillator must always be constant in amplitude and of a form that lends itself to harmonic removal by amplitude correction rather than filtering. In meeting the first requirement some form of resistance-capacitance or resistance-inductance oscillator is indicated in which only the resistive element is the variable component for change of frequency. The second requirement becomes necessary where the frequency shift is greater than 2 to 1. In cases of less than 2 to 1 shift, it is possible to build a low pass filter to eliminate the second harmonic of the lowest frequency, while still passing the fundamental of the highest frequency encountered. Beyond these limits filtering within the usual meaning is impossible.

The signal produced by the phototube 16 varying in amplitude according to the variations in light intensity picked up from copy 11 is fed over lead 55 to a point of reference potential or ground through a resistor 56. The modulating signal is taken off the resistor 56 by means of a variable tap and applied to the control grid of a pentode vacuum tube 57. The cathode, screen grid and suppressor grid of the pentode 57 are connected to a resistive voltage dividing network including resistors 58, 59 and 60 such that the electrodes are properly biased to cause the pentode 57 to be normally conducting at a level determined by the setting of the variable tap on resistor 60. A large capacitor 61 or storage device is connected to charge at constant current by the plate current of the pentode 57. The modulating signal voltage applied to the control grid of pentode 57 changes its current, and thus changes the rate of charge of the capacitor 61, changing the frequency.

When the capacitor 61 charges to the same voltage as across the resistor 58, a gas triode tube 62 is triggered on to discharge the capacitor 61. The capacitor immediately starts charging again towards the formation of the next cycle. The same peak-to-peak voltage is held at all frequencies, and the sawtooth therefore has a definite direct current (D.C.) center line as a reference. The charging current of capacitor 61, the plate current of pentode 57, is determined by the input signal to the control grid of the pentode 57 and is not affected by changing the plate supply voltage of the pentode 57 over the limits of the charging cycle of capacitor 61. Thus, the frequency of oscillation is increased as the control grid signal of pentode 57 increases in a positive direction or greater light intensity. The rate at which the charging tion of the phase shifting circuit arrangement included in the circuit diagram given in Figure 6.

As shown in Figure 1, a flying spot type of cathode ray scanner 10 which is conventional in construction and operation is used for horizontally sweeping a scanner copy 11 having an image to be transmitted. The scanner 10 functions in cooperation with a suitable optical arrangement represented by a lens 12 to cause a beam or spot of light to be moved across the copy 11 as indicated by the arrows. The vertical sweep is obtained by mechanical motion of the copy sheet 11. A mechanical memeber shown as a wheel 13 has teeth arranged about the periphery thereof so as to engage holes spaced along one edge of the copy 11. The wheel 13 is operated by a suitable driving means 14 through a mechanical connection 15 represented by the dottted line to step the copy 11 the width of one scanning line at each fly-back signal pulse of the scanner applied to the driving means 14. While a particular arrangement for obtaining the horizontal and vertical sweep is shown, other known arrangements may be used.

A phototube 16 responds to the reflected light from the copy 11 and applies a modulating signal to a frequency modulated sawtooth oscillator 17, the modulating signal varying in amplitude according to the variations in light intensity. The frequency of the FM oscillator 17 is modulated according to light intensity, the direction of modulation being towards an increase in frequency for an increase in light. The frequency modulated sawtooth output carrier wave is applied from the oscillator 17 to a plurality of separate pulse producing circuits identified in Figure 1 as pulse pickups at preset angles 18.

For purposes of description, it will be assumed that each carrier cycle or sawtooth wave produced by the oscillator 17 is to include four bits of information. The frequency swing is sufficiently wide to allow a four to one ratio between fastest and slowest sweep speeds. Four pulse producing circuits or pickups 18 are provided which are arranged to be individually triggered by the FM wave at definite angles, namely 0°, 90°, 180° and 270°. Four pulses are generated for each carrier cycle, the pulses always occurring at the same angles for all frequencies of the oscillator 17. Thus, the four pulses per carrier cycle are spaced in time according to any changes in the slope of the sawtooth wave and, therefore, according to a change in the frequency of the FM wave. The pulses produced by the pulse pickups 18 are fed to a pulse-to-step function integrator 19 which generates a stair step output wave. The height of each step is the same, the height being held until the next pulse, and so on. The stair step output wave is fed to a horizontal sweep amplifier 20 which functions in response thereto supply the horizontal deflection to the proper coils of the yoke of the scanner 10. The beam is notched across the scanner tube 10 in equal steps, remaining in each position until the next pulse is produced by the pulse pickups 18.

Because of the step function deflection, the modulating signal generated by the phototube 16 is also a step function, the phototube 16 generating a signal proportional to light intensity for the total time that the beam is stationary on one element of the copy 11. The sawtooth oscillator 17 is arranged to respond to the step function phototube signal almost instantly, and the oscillator 17 output wave is changed in frequency for each jump in deflection. A sawtooth oscillator 17 is used because it is instantly responsive to changes in frequency at any part of the cycle, and also because of the ability to trigger pulses from it an any angle during the cycle without regard to its operating frequency.

A variable velocity facsimile system is provided. For white or high light intensity elements on the copy 11, the modulating signal supplied by phototube 16 is of maximum amplitude, resulting in the oscillator 17 output carrier wave being at the upper FM limit or white frequency, for example, 2000 cycles per second. The pulses produced by the pulse pickups 18 are spaced relatively close together in time, and the beam produced by the scanner 10 remains at each element position for a minimum time duration. For black or low light intensity elements on the copy 11, the modulating signal supplied by the phototube 16 is of minimum amplitude. The oscillator 17 carrier wave output is at the lower FM limit or black frequency, for example, 500 cycles per second. The pulses produced by the pulse pickups 18 are spaced correspondingly further apart in time. Assuming a 1000 cycle keying rate, the beam produced by the scanner 10 is notched up every ½ cycle of the 500 cycle frequency, resulting in an exposure time of one millisecond per image element. For white, the beam moves four times as fast and allows ¼ millisecond per image element. A four-to-one ratio in exposure is obtained between black and white which is sufficient to reproduce a good image. The ratio between the end frequencies determines the ratio between fastest and slowest sweep speeds, the beam produced by the scanner 10 travelling slowest for black (maximum definition) and fastest for white (minimum definition). As the intensity of the reflected light picked up by the phototube 16 varies from image element to image element between the limits of white and black, the sweep speed is changed almost instantaneously within the limits thereof to correspond with the changes in light intensity.

A fixed limit of sweep of the horizontal deflection is used determined according to the width of the image on the copy 11, and so on. When this limit is reached, the integrator 19 automatically returns the horizontal sweep to start by returning the stair step output wave to the original level. The next stair step output wave is started upon the first pulse being received from the pulse pickups 18. At the same time, the integrator 19 produces a fly-back pulse which is fed over connections represented by lead 21 to the oscillator 17 and driving means 14. The fly-back pulse amplitude modulates the oscillator 17, providing a fly-back signal at the facsimile recorder. While amplitude modulation is described in connection with Figs. 1 and 2, the fly-back pulse can frequency modulate the oscillator 17, using a frequency outside the normal facsimile channel. The driving means 14 is actuated in response to the fly-back pulse to operate the wheel 13 via connection 15 to move the copy 11 to the next scanning line.

The frequency modulated sawtooth carrier wave including the fly-back signal which appears at the output of the oscillator 17 has a high harmonic content and must be processed or polished to shape it to an approximate sine wave before it can be readily transmitted over a radio link or wire line to the facsimile recorder. In addition, ordinary filters can not be used due to the wide frequency swing in proportion to the carrier. The output carrier wave is fed from the oscillator 17 to a full wave rectifier 22 which functions to produce a symmetrical triangular wave from the sharp edged sawtooth wave. The triangular wave is then passed through two shapers 23, 24 which bend over the sharp peaks of the triangular wave. The shapers 23, 24 operate on an amplitude basis, so that the wave is shaped in the same manner for any frequency. Thus, filtering and its attendant problem of phase or delay distortion is avoided. The sawtooth wave is reformed into a near sine wave with approximately 98 percent fundamental frequency. The sine wave output of the second shaper 24 is amplified by an output amplifier 25, and appears at the output of the amplifier 25 for transmission over a suitable wire line or radio link 26. Each cycle of the carrier wave forwarded over the link 26 includes four bits of information in the manner described.

The facsimile recorder includes an input amplifier 27 to which the incoming sine wave carrier wave is applied. The amplified sine wave carrier wave is applied from the amplifier 27 to a phase detection circuit arrangement.

current can be changed is determined by the high frequency response of the pentode 57 as a current generator only, and the large capacitor 61 does not affect this rate. Response to sudden changes in the modulating input signal is practically instantaneous compared to the frequency of the output wave.

The control grid of a cathode follower triode tube 63 is connected to the plate of pentode 57. Tube 63 functions as a transfer tube without gain. The tube 63 draws negligible current, and its operation does not affect the charge rate of capacitor 61. Since the amplitude peak-to-peak value of the sawtooth voltage applied to the control grid of tube 63 is constant at the value of the voltage across resistor 58 regardless of the number of times or amount the slope is changed during a cycle, a D.C. centerline of given voltage value is automatically obtained as a zero reference for the tube 63. The output of the tube 63 taken across a resistive voltage dividing network including resistors 64, 65, 66 and 67 will have definite D.C. output voltages at any angle of the cycle of the sawtooth.

In accordance with the example given, it is assumed that four bits of information are to be included in each carrier cycle. Four pulse pickups for deriving pulses at 0°, 90°, 180° and 270° angles of each sawtooth cycle are therefore provided. Because the capacitor 61 is large and the discharge thereof is extremely rapid, the output for the 0° angle is taken via lead 73 directly from the plate of pentode 57 through a differentiating circuit including capacitor 70 and resistor 71 connected to ground and a diode 72 poled to pass a positive pulse at each 0° angle of the sawtooth waves. The plate of gas tube 62 and capacitor 61 are returned to the positive terminal 68 of a source of unidirectional potential, for example, 300 v., while the plate of tube 63 is returned to the positive terminal 69 of a source of higher unidirectional potential, for example, 400 v. The cathode voltage of tube 63 therefore follows the potential of the negatively charging capacitor 61. The network of resistors 64, 65, 66 and 67 is, in effect, a voltage divider across the capacitor 61.

Each of the 90°, 180° and 270° pulsers or pulse pickups 18 is a two stage amplifier arranged to operate as a D.C. flip-flop. The 90° pulser includes a diode 74 having a cathode connected to a variable tap on resistor 66 and a plate connected to the control grid of a triode tube 75 and to terminal 68 through a resistor 76. The cathode of tube 75 is connected to ground through a resistor 77 and to the cathode of a second triode tube 78 through a resistor 79. The plate of tube 75 is connected to terminal 68 through resistor 80 and to the control grid of tube 78 through a parallel-connected capacitor 81 and resistor 82, the control grid of tube 78 being connected to ground through a resistor 83. The plate of tube 78 is connected to terminal 68.

In standby operation tube 78 is cut-off, and tube 75 is conducting. For each 90° angle of the sawtooth cycle developed across capacitor 61, the cathode of tube 63 drops sufficiently negative to cause the voltage drop across resistor 66 and the current fed through diode 74 poled to conduct in response thereto to reach a level sufficient to render tube 75 non-conducting. The plate of tube 75 goes positive, pulling the control grid of tube 78 sufficiently positive to cause tube 78 to conduct. The cathode of tube 78 goes positive ensuring that tube 75 is cut-off by cathode action. The positive-going transition at the plate of tube 75 results in a positive pulse being developed through a differentiating circuit including capacitor 84 and resistor 85 connected to ground and diode 86 poled to pass the positive pulse.

The construction and operation of the 180° pulser and 270° pulser are similar to that of the 90° pulser. The 180° pulser includes a first triode tube 87 normally cut-off, and a second triode tube 88 normally conducting. The control grid of tube 88 is connected to resistor 65 by a variable tap through a diode 89 poled to conduct in response to the negative voltage developed across resistor 65. At each 180° angle of the sawtooth voltage developed across the capacitor 61, the cathode of tube 63 drops sufficiently more negative that the voltage developed across resistor 65 results in the current through the diode 89 to tube 88 becoming sufficiently negative to render tube 88 non-conducting. Tube 87 conducts. The positive-going transition at the plate of tube 88 causes a positive pulse to be developed through the differentiating circuit including capacitor 90 and resistor 91 connected to ground and diode 92 poled to pass the positive pulse.

The 270° pulser includes a first triode tube 93 normally cut-off and a second triode tube 94 normally conducting. The control grid of tube 94 is connected to resistor 64 by a variable tap through a diode 95 poled to conduct in response to the negative voltage developed across resistor 64. At each 270° angle of the sawtooth voltage developed across the capacitor 61, the cathode of tube 63 becomes sufficiently negative to bias the control grid of tube 94 through diode 95 from resistor 64 below cut-off, and tube 94 becomes non-conducting. Tube 93 conducts. A positive pulse is produced by the differentiating circuit including capacitor 96 and resistor 97 connected to ground and passed by a diode 98.

By the above action, four pulses are produced for each sawtooth cycle regardless of frequency. By properly setting the connections to the respective resistors 64, 65 and 66, the pulse pickups 18 always furnish their pulses at the correct angle after start of the sawtooth wave. Following a cycle of oscillation or sawtooth, each pulse pickup 18 is shifted in state. Tubes 78, 87 and 93 are conducting, while tubes 75, 88 and 94 are cut-off. Capacitor 61 is then discharged by the conduction of gas tube 62, and the voltage developed across the resistors 64, 65 and 66 reverses in polarity. This change in voltage polarity causes tubes 75, 88 and 94 to conduct, tubes 78, 87 and 93 becoming non-conducting. Diodes 86, 92 and 98 remain non-responsive to the negative transitions at the plates of tubes 75, 88 and 94, respectively, since they are poled to pass only positive pulses.

The four positive pulses per cycle of oscillation appearing at the outputs of diodes 72, 86, 92 and 98 are added together such that they interlace in time and are fed to the control grid of a pentode tube 99 of integrator 19 via lead 100 and resistor 105 connected to ground. The cathode, screen grid and suppressor grid of pentode 99 are connected to a resistive voltage dividing network including resistors 106, 107 and 108 such that the proper bias is supplied to the electrodes to render pentode 99 normally non-conducting. The pulses applied to the control grid of pentode 99 all have identical base time widths, causing the pentode 99 to become conducting for this same time interval during each pulse at a level determined by the setting of the variable tap on resistor 107. A capacitor 109 connected between terminal 68 and the plate of pentode 99 is charged to a slightly higher voltage at each pulse until it reaches the same voltage as across resistor 106. At this point a gas triode tube 110 is made conducting and discharges capacitor 109 to return the stair step output wave to the starting level for the next scanning line. Since the base time widths of the pulses applied to pentode 99 are identical, causing pentode 99 to conduct for the same time interval, the height of each step of the stair step wave produced is the same. However, the time interval between steps varies according to the spacing between the pulses applied to the pentode 99.

The stair step output wave of the integrator 19 is fed to the control grid of a cathode follower triode tube 111. The plate of the tube 111 is connected to the terminal 69, and the cathode of tube 111 follows the potential developed across the capacitor 109. The output of tube 111 is taken from between two resistors 112 and 113 in the cathode circuit of tube 111 and applied to the control grid of a first multi-grid tube 114 in the horizontal sweep or yoke drive amplifier 20. The cathode of tube 114 is connected to ground through resistor 115 and to the cathode of a second multi-grid tube 116. A resistive voltage dividing network including resistors 117, 118 and 119 is provided between terminal 68 and ground. The control grid of tube 116 is connected to a point between resistors 118 and 119, while the screen grids of tubes 114 and 116 are connected together and to a point between resistors 117 and 118. The plate of tube 116 is connected to terminal 68 through resistor 120, while the plate of tube 114 is connected to terminal 68 through resistor 121. The horizontal deflection voltages developed at the plates of tubes 114 and 116 are applied over leads 122 and 123, respectively, to the scanner 10.

By the above operation, the beam or spot of light produced by the scanner 10 is stepped across the copy 11 four times for each cycle of oscillation produced by the oscillator 17. A step function signal is supplied to the pentode 57 from the phototube 16 such that the frequency of the output or carrier wave is changed at each ¼ cycle of the output wave as a function of light intensity. At the end of a scanning line as determined by the width of the image on the copy 11, and so on, capacitor 109 is discharged. A new stair step wave is started, causing the scanner 10 to start a new sweep across the copy 11 in the direction of the arrow. The cathode of gas tube 110 is connected to the control grid of a normally cut off triode tube 124 through a differentiating circuit including capacitor 125 and resistor 126 connected to ground. The plate of tube 124 is connected to terminal 68 through resistor 127, the cathode of tube 124 being connected to a point between resistors 128 and 129 series-connected between terminal 68 and ground. Upon gas tube 110 becoming conducting, a positive pulse is applied to the control grid of tube 124 such that tube 124 conducts. A high level negative or fly-back pulse is produced which is fed to resistor 56 of oscillator 17 and the driving means 14 over an electrical path including capacitor 130, resistors 131, 132 series-connected to ground, a diode 133 biased to pass only the negative pulse and lead 134. Bias for the diode 133 is provided by resistors 132 and 145 connected between ground and terminal 68 and renders the diode 133 inoperative except during fly-back. Thus, it can not load down the phototube resistor 56 while scanning. Since the fly-back pulse is negative contrasted to the modulating signal supplied by the phototube 16, the carrier wave produced by the oscillator 17 is amplitude modulated by the fly-back pulse. Pentode 57 is driven toward cut-off and may be driven below cut-off such that a sharp and readily distinguishable change in the amplitude of the carrier output wave occurs marking the end of the scanning line. At the same time, the driving means 14 functions in response to the fly-back pulse to drive the wheel 13 via connection 15 to move the copy 11 up to the next scanning line.

A sawtooth carrier wave appears at the output of oscillator 17 in which breaks in frequency or charging slopes are just as sharp as the signal producing them. The frequency at each ¼ cycle of the carrier wave is determined according to the amplitude of the signal generated by the phototube 16 at that instant in time as the beam comes to stop on each new image element. If black elements are detected, the signal amplitude is relatively low, causing the carrier wave to be modulated at the lower limit or, for example, 500 cycles per second. The pulse pickups 18 will produce a series of pulses spaced such that the beam generated by scanner 10 sweeps the copy 11 at the slowest speed for greater definition. For white elements, the signal amplitude is relatively high, causing an increased charge rate and the carrier wave to be modulated at the upper limit or, for example, 2,000 cycles per second. The pulses produced by the pulse pickups 18 are spaced such that the beam generated by the scanner 10 sweeps the copy 11 four times as fast as when black elements occur, since less definition is needed. The speed of the sweep will automatically adjust to gray frequencies between the frequency limits.

Figure 3:
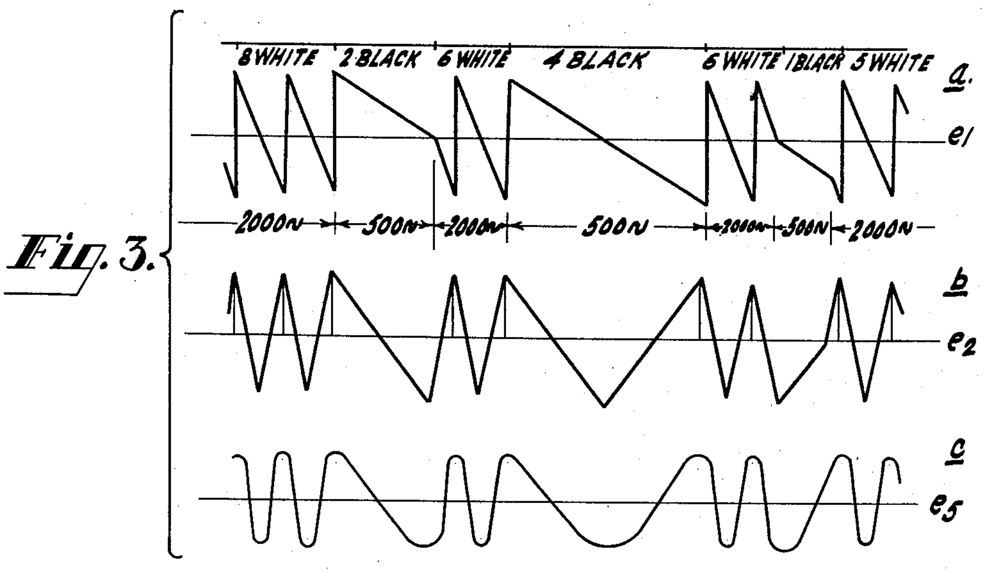
Figure 3 is a series of curves to be used in describing the operation of the circuit diagram given in Figure 2.

A curve representative of the frequency modulated sawtooth carrier output wave $e_1$ of the oscillator 17 is shown by way of example in Fig. 3*a*. The first eight image elements are white, the next two image elements are black, the next six are white and so on, there being four bits of information per carrier cycle. The carrier output wave $e_1$ is fed from the plate of pentode 57 to the control grid of a triode tube 140 over an electrical path including lead 73, capacitor 141 and resistors 142 and 143 series-connected to ground. The plate of tube 140 is connected to terminal 68 over an electrical path including resistor 144. The cathode of tube 140 is connected to ground through resistors 146 and 143. Tube 140 supplies two voltages at 180° phase difference for rectification by the full wave rectifier 22. Since the peak-to-peak value of the sawtooth voltage is constant regardless of the number of times or amount the slope is changed during a cycle, a D.C. centerline of the carrier wave $e_1$ is automatically obtained as a zero reference for the tube 140 which follows the oscillator 17.

The plate of tube 140 is connected to the plate of a diode 147 over an electrical path including capacitor 148 and resistor 149 connected to ground, while the cathode of tube 140 is connected to the plate of a second diode 150 over an electrical path including capacitor 151 and resistor 152 connected to ground. The cathodes of diodes 147 and 150 are connected in common to the control grid of a cathode follower triode tube 153 and to ground through resistor 154. The full wave rectification of the sawtooth carrier wave $e_1$ by rectifier 22 produces the symmetrical triangular wave $e_2$ shown in the curve of Fig. 3*b* at the control grid of cathode follower 153. A sharp line extending to the center line from the positive peaks is shown. This is the extremely short time while gas tube 62 is discharging capacitor 61, and practically disappears before rectifier 22 is reached if the tube 140 is limited in high frequency response by its circuit constants.

It can be seen from the wave $e_2$ given in Figure 3*b* that at any steady state frequency of operation, the output wave of the rectifier 22 is a symmetrical triangular wave of constant peak-to-peak amplitude, and also of a constant harmonic content. No even harmonics are present because of symmetry, and the odd harmonics are present in values of $$\frac{1}{n^2}$$

Thus, the 3d harmonic has a value of 1/9, the 5th has a value of 1/25, and so on.

One method of shaping the triangular wave $e_2$ is given in Figure 2. The plate of cathode follower tube 153 is connected to terminal 68. The cathode of tube 153 is connected to ground through resistor 155. A first shaper 23 includes a first diode 156 and second diode 157. The plate of diode 156 and the cathode of diode 157 are connected to the cathode of cathode follower tube 153 through resistors 158 and 159. A resistive voltage divider is provided including resistors 160, 161, 162 and 163. The cathode of diode 156 is connected to a variable tap on resistor 161, while the plate of diode 157 is connected to a variable tap on resistor 162. A second shaper 24 includes a cathode follower triode tube 164. Cathode follower tube 164 includes a control grid connected to a point between resistors 158 and 159 and a cathode connected to ground through resistor 165. The plate of cathode follower tube 164 is connected to terminal 68. A pair of diodes 166 and 167 are provided. The plate of diode 166 and the cathode of diode 167 are connected to the cathode of cathode follower tube 164 through resistors 168 and 169. A resistive voltage divider includes resistors 170, 171, 172 and 173. The cathode of diode 171 is connected to a variable tap on resistor 171, while the plate of diode 167 is connected ot a variable tap on resistor 172. While the elements 156, 157, 166 and 167 are defined as diodes, the elements, as well as the remaining diodes shown in Figure 2, may be in practice any suitable unidirectional current conducting device.

Figure 4:
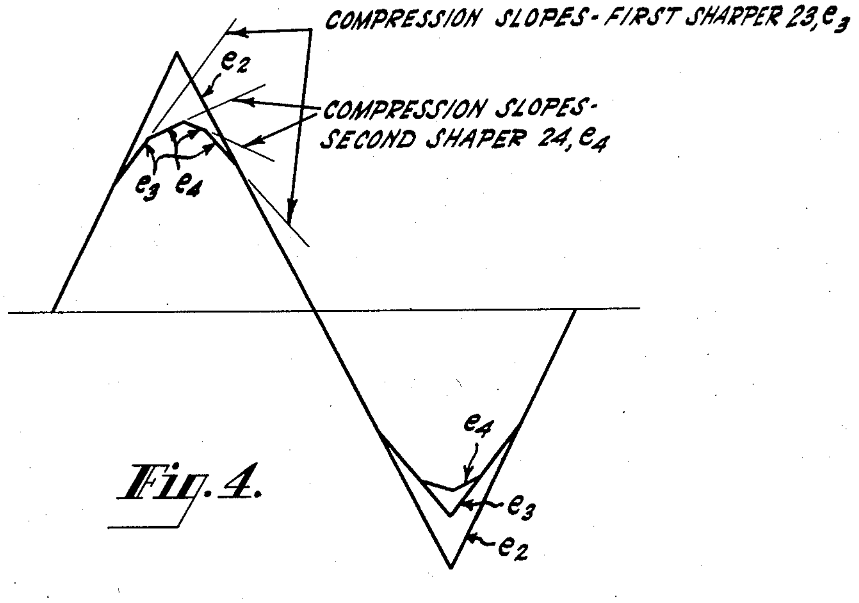
Figure 4 is a curve to be used in describing the operation of the signal shapers included in the circuit diagram given in Figure 2.

The shapers 23, 24 or diode limiters function to alter the slope of the triangular wave $e_2$ at definite fixed amplitudes. The shapers 23, 24 load down or bend the peaks of the triangular wave $e_2$ to form a synthetized sine wave. As shown in the curve given in Figure 4, the taps on the resistors 161 and 162 are set so that when the voltage of the wave $e_2$ is between the limits of the settings of resistors 161 and 162, the wave $e_3$ equals the wave $e_2$. When the voltage of wave $e_2$ exceeds these limits, the resistor 158 becomes the lower section of a potentiometer of which resistor 159 is the upper section. The slope or rate of increase of the wave $e_3$ applied to the control grid of cathode follower tube 164 is made less than that of the wave $e_2$. Diode 156 conducts to pass the positive peak voltage of wave $e_2$, and diode 157 conducts to pass the negative peak voltage of wave $e_2$. When the voltage of the wave $e_3$ is between the limits of the settings of resistors 171 and 172, wave $e_4$ equals the wave $e_3$. When it exceeds these limits, the resistor 168 becomes the lower section of a potentiometer of which resistor 169 is the upper section, and the slope or rate of increase of the wave $e_4$ is made less than that of the wave $e_3$, as shown in Figure 4.

The triangular wave $e_2$ is first bent by the shaper 23 at the 45° points by setting the first shaper to have its threshold voltages (determined by the settings of resistors 161 and 162) at 0.5 the peak-to-peak value of the wave $e_2$. The values of resistors 158 and 159 are proportional to change the slope to 0.615 of its former value. This new portion of the wave $e_3$ will cross the true sine wave at 67.5°, at which the limits of the second shaper 24 are exceeded. The second loading by shaper 24 again changes the slope to where it will reach the true value at 90°. In this manner, each half cycle of the wave $e_4$ is, as shown in Figure 4, formed out of 6 straight lines and is correct in value at the 0°, 45°, 67.5°, 90°, 112.5°, 135° and 180° points. As this is a geometrical construction and controlled by amplitude only, the frequency of the wave has no effect, and the harmonic content is the same for all frequencies. The fundamental accounts for approximately 98 percent of the output with the sum of all harmonics approximately 2 percent.

The near sine wave carrier $e_4$ is fed to ground through a capacitor 174 and resistor 175. An output amplifier 25 includes a triode tube 176 having a control grid connected to a variable tap on resistor 175. The cathode of tube 176 is connected to ground through the parallel-connected resistor 177 and capacitor 178. The plate of tube 176 is connected to terminal 68 through the primary winding 179 of an output transformer 180. The sine wave carrier output wave $e_5$ appears across the secondary winding 181 of transformer 180 in the form given in Figure 3*c*. Each cycle of the carrier output wave $e_5$ includes four bits of information.

Figure 5:
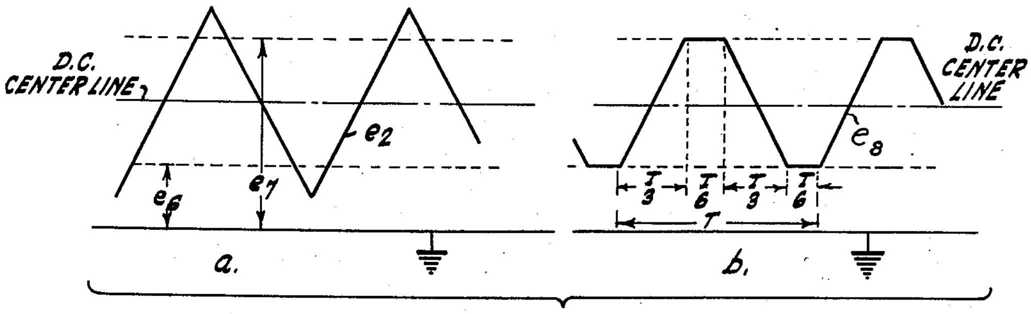
Figure 5 is a series of curves to be used in describing the operation of a further embodiment of the signal shapers included in the circuit diagram given in Figure 2.

While one method of synthetizing the near sine wave $e_4$ from the triangular wave $e_2$ is given in Figure 2, other methods may be used. One such method is shown in the series of curves given in Figure 5. A diode limiter may be used including two diode clippers to cut off the top and bottom peaks and form a trapezoidal wave $e_8$. The diodes of the limiter are connected much the same way as the diodes 156, 157 in the shaper 23 given in Figure 2, except that the resistor 158 equals zero. When the voltages biasing the limiter, $e_6$ and $e_7$ given in Figure 5*a*, are set symmetrically above and below the D.C. center line of the input wave $e_2$, and when $e_7 - e_6$ equals $9.667e_2$ (peak-to-peak), then the wave $e_8$ in Figure 5*b* is obtained. A slope change occurs when $e_2$ is less than $e_6$ and when $e_2$ is greater than $e_7$, the new slope being set by the ratio of resistor 158 over resistor 158 plus resistor 159. That is, the slope is zero with resistor 158 equal to zero, producing the trapezoidal wave $e_8$. The wave $e_8$ is a special shape where the third harmonic is cancelled and the fifth harmonic is the first component above the fundamental frequency to appear. However, the percentage of fundamental frequency is lower than that produced by the arrangement of shapers 23 and 24 shown in Figure 2.

By first producing a sawtooth wave, converting the sawtooth wave to a triangular wave and then to the near sine wave carrier output wave, it is possible to obtain a change in frequency without delay which would result from the conventional reactance control of the frequency of an inductance-capacitance oscillator. The various angular positions at which the carrier waves stop and start are not displaced from true value in time by phase errors as introduced in the use of filters.

In normal FM detection systems, two pieces of information or bits are obtained per cycle, one for each half cycle of the carrier. The carrier must always be considerably greater than the modulating frequency for there to be enough bits of information to reconstruct the signal on detection. Such conventional FM detection systems are not suitable for use in the FM system of the invention since the modulating signal is assumed to approach the carrier in actual frequency. More than two bits of information must be recovered per carrier cycle to reconstruct the signal.

One phase detection system capable of reconstructing the signal from the carrier output wave $e_5$ generated by the arrangement of Figure 2 is given in the circuit diagram of Figure 6. The FM signal is applied to the primary winding 185 of an input transformer 186. The pair of phase shifters 28, 33 are connected to the secondary winding 187 of transformer 186. The first phase shifter or network includes a resistor 188 and capacitor 189 series-connected across the winding 187 which is centertapped to ground. The network has a phase lag of 90° at the center frequency of the FM band. The second phase shifter or network including the series tuned inductance 190-capacitor 191 circuit and resistor 192 series-connected across the winding 187 is tuned to have 180° lag at the center frequency. The resistor 192 is adjusted in value such that the phase difference between voltages $e_a$ and $e_b$, the two output voltages, is within plus or minus 2° of the 90° desired over the range of frequency change. The amplitudes of voltages $e_a$ and $e_b$ are constant at all frequencies. Allowing for delays experienced in the phase shifters 28 and 33, the wave $e_a$ appears as shown in the curve of Figure 7*a*, while the wave $e_b$ appears as shown in the curve of Figure 7*b*. The zero crossovers of one signal occur at the peaks of the other signal, and so on.

The two voltage waves $e_a$ and $e_b$ are applied to two limiters identified as limiters-phase A and B in Figure 6. The wave $e_a$ is applied to the limiter-phase A which includes an amplifier triode tube 193 having a control grid connected to the junction of resistor 188 and capacitor 189 over an electrical path including the parallel-connected capacitor 194 and resistor 195. The cathode of tube 193 is connected to ground through resistor 196, while the plate of tube 193 is connected to the positive terminal 197 of a source of unidirectional potential, for example, 300 v., through resistor 198. The plate of tube 193 is connected to the control grid of the limiter triode tube 199 over an electrical path including capacitor 200, resistor 201 connected to ground, and the parallel-connected capacitor 202 and resistor 203. The cathode of tube 199 is connected to ground through resistor 204, and the plate thereof is connected to terminal 197 through resistor 205. The plate of limiter tube 199 is also connected through capacitor 206 to a point between resistors 207, 208 included in a resistive voltage divider connected between terminal 197 and ground. Tube 199 functions as a conventional limiter such that a high voltage square wave with accurately defined zero crossings appears at the output thereof. The resulting square wave $e_c$ is shown in the curve of Figure 7*c*.

A phase inverter triode tube 209 is provided having a control grid connected to the junction of resistors 207 and 208 and through capacitor 206 to the plate of limiter tube 199. The plate of tube 209 is connected to terminal 197 through resistor 210, and the cathode thereof is connected to ground through resistor 211. One polarity of the square wave $e_c$ is fed from the plate of tube 209 to the plate of the diode 31 through a portion of the differentiating circuit 30 including capacitor 212 and resistor 213 connected to ground. The opposite polarity is fed from the cathode of tube 209 to the plate of the diode 32 through the remaining portion of the differentiating circuit 30 including capacitor 214 and resistor 215 connected to ground. The diodes 31, 32 are poled such that the two inverter outputs are full wave rectified, a positive pulse being obtained at the cathodes of diodes 31, 32 for each transition point of the square wave $e_c$.

The wave $e_b$ is processed in a similar manner by limiter-phase B. The control grid of an amplifier triode tube 216 is connected to the junction of resistor 192 and capacitor 191 through the parallel-connected resistor 217 and capacitor 218. The plate of tube 216 is connected to terminal 197 through resistor 219, while the cathode thereof is connected to ground through resistor 220. The plate of amplifier tube 216 is connected to the control grid of the limiter triode tube 221 over an electrical path including capacitor 222, resistor 223 connected to ground and the parallel-connected capacitor 224 and resistor 225. The cathode of tube 221 is connected to ground through resistor 226, and the plate thereof is connected to terminal 197 through resistor 227. The plate of limiter tube 221 is connected through a capacitor 229 to a point between resistors 230 and 231 forming a voltage dividing network between terminal 197 and ground. A high voltage square wave $e_d$, as shown in the curve of Figure 7*d*, appears at the output of the limiter tube 221.

A phase inverter triode tube 232 is responsive to the square wave $e_d$ to supply both the positive and negative forms thereof. The plate of tube 232 is connected to terminal 197 through resistor 233, and the cathode thereof is connected to ground through resistor 234. One polarity of the square wave $e_d$ is applied from the plate of tube 232 to the plate of diode 37 through a portion of the differentiating circuit 35 including capacitor 235 and resistor 236 connected to ground. The opposite polarity is applied from the cathode of tube 232 to the plate of diode 36 through the remaining portion of the differentiating circuit 35 including capacitor 237 and resistor 238 connected to ground. Diodes 36 and 37 function as a full wave rectifier in response to the two inverter outputs such that a positive pulse appears at the cathodes thereof for each transition point of the square wave $e_d$.

By the above action, four pulses per cycle of the carrier wave $e_5$ received are recovered at the cathodes of diodes 31, 32, 36 and 37. These pulses are added together across a resistor 239. The spacing between pulses permits the proper interlacing thereof, the time spacing between each two pulses representing the duration time for that ¼ cycle of the carrier frequency. A train of pulses is generated resembling the train of pulses produced by the pulse pickups 18 and applied to the control grid of pentode 99, each two pulses being spaced by a time interval substantially equal to the time interval between corresponding pulses applied to the pentode 99. The resulting pulse train appears as shown in the curve of Figure 7*e*. The first four pulse periods occur over a time interval equal to the duration of the first sawtooth wave shown in Figure 3*a*, and so on.

The pulse train $e_e$ is applied to the control grid of a pentode tube 240. A resistive voltage divider including resistors 276, 242 and 243 is provided. The cathode and suppressor grid of pentode 240 are connected to the resistor 243 via a variable tap, and the screen grid is connected to the resistor 242 via a variable tap. The settings of resistors 242, 243 are determined so that pentode 240 normally non-conducting becomes conducting for each pulse of the pulse train $e_e$. Since the time base of the pulses in train $e_e$ are identical, pentode 240 conducts for the same duration in response to each pulse. A capacitor 244 connected between the plate of pentode 240 and terminal 197 is charged to a higher voltage for each conducting period of the pentode 240, the voltage across the capacitor 244 approaching that across a resistor 241.

An envelope detector in the form of a pair of diodes 245, 246 connected in series-opposition across the secondary winding 187 detects the envelope of the FM signal $e_5$ and forwards the envelope to the control grid of a fly-back trigger, triode tube 279 over an electrical path including capacitor 280 connected to ground, resistor 281 connected to ground and lead 247. The plate of tube 279 is connected to terminal 197 through resistor 241 and to the control grid of a gas tube 248. The cathode of tube 279 is connected to a point between resistor 249 and variable resistor 250 forming a voltage dividing network between terminal 197 and ground. Tube 279 is normally conducting in response to the full envelope applied thereto indicating the reception of an information portion of the facsimile signal at a level determined by the setting of resistor 250. A negative bias voltage is applied to the control grid of gas tube 248 holding the gas tube 248 non-conducting and permitting the capacitor 244 to charge to a new slightly higher voltage for each conduction of the pentode 240.

When the fly-back signal is received indicating the end of a scanning line, a sharp amplitude change or gap occurs in the FM signal $e_5$. This gap is detected by diodes 245 and 246 such that the control grid of tube 279 is sharply driven negative. Tube 279 is cut-off, producing a sharp positive pulse at the control grid of gas tube 248. The voltage across capacitor 244 at this time equals or approaches the voltage across resistor 241 such that the gas tube 248 conducts, discharging the capacitor 244 and terminating the stair step wave. The capacitor 244 immediately begins to again charge at the next conduction of pentode 240 to form the next stair step wave. A series of stair step waves are produced at the output of pentode 240, resembling the stair step waves appearing at the output of the pentode 99.

The plate of pentode 240 is connected to the control grid of a cathode follower triode tube 251, having a plate connected to terminal 197 and a cathode connected to ground through resistors 252 and 253. The junction of resistors 252 and 253 is connected to the control grid of a first multi-grid tube 254 in the yoke drive or horizontal sweep amplifier 40. The cathode of tube 254 is connected to ground through resistor 255 and to the cathode of a second multi-grid tube 256 of the amplifier 40. A resistive voltage divider is provided including resistors 257, 258 and 259, the control grid of tube 256 being connected to the junction of resistors 258 and 259. The screen grids of tubes 256, 254 are connected together and to the junction of resistors 257 and 258. The plate of tube 254 is connected to terminal 197 through resistor 260, and the plate of tube 256 is connected to terminal 197 through resistor 261. The horizontal deflection voltages are fed from the plates of tubes 254, 256 to the flying spot recorder 41 over leads 262 and 263, respectively.

The recorder 41 sweeps the light sensitive paper 43 to reproduce an image thereon. The motion of the scanning beam of the recorder 41 duplicates that of the step sweep of the scanner 10. Each time the fly back signal is received, the pulse produced at the plate of tube 279 is applied to the driving means 46 over lead 264. The driving means 46 functions to operate the wheel 47 via connection 48 to move the paper 43 up one scanning line, and so on. The exposure time of the paper 43 is equal to the time difference between successive pulses applied to the pentode 240 of integrator 38. Figure 8 presents a comparison of the relative exposure times and the image element number. As indicated in Figure 3*a*, the first eight image elements are assumed to be white. The corresponding pulses of pulse train $e_e$, Figure 7*e*, applied to integrator 38 occur at each 90° of the upper frequency limit of 2000 cycles per second. Minimum exposure occurs for each element since minimum definition is needed. The next two image elements 9 and 10 are assumed to be black. The corresponding pulses of pulse train $e_e$ occur at each 90° of the lower frequency limit of 500 cycles per second. Maximum exposure occurs for elements 9 and 10 since maximum definition is needed, and so on. For gray frequencies between the limit frequencies, the pulses applied to the integrator 38 are properly spaced to cause the correct exposure time for each image element.

One circuit arrangement for providing two FM signal waves $e_a$ and $e_b$ that differ from each other by 90° phase at all frequencies within the band used has been given in Figure 2. The invention is, however, not limited to this particular arrangement. The chief requirement for the phase shifters 28, 33 is that the two output voltages $e_a$ and $e_b$ derived from the common FM input be separated in phase by a constant angle at all frequencies in the FM band. A constant amplitude is not required as long as the changes in amplitude with frequency are not to great to be effectively removed by the limiter amplifiers 193 and 216 following the shifters. The simplest such network is shown in Figure 9 in which a resistor 265 and capacitor 266 are connected across the input FM signal. Since they pass the same current, the voltages $e_a$ and $e_b$ are at 90° phase difference for all frequencies. If resistance R equals capacitive reactance $X_c$ at the center frequency of the band, $e_a$ will lag by 45° and $e_b$ will lead by 45° at this frequency. For higher and lower frequencies these angles will change but their difference will remain at 90°.

A further method of obtaining the 90° phase difference is shown in Figure 10. Two diode limiters or clippers are used, one including diodes 267 and 268 fed through a resistor 269 in the normal fashion so that the output voltage $e_a$ is a square wave in phase with the input signal voltage $e_5$. The second limiter including diodes 270 and 271 is fed through a capacitor 272 and also delivers a square wave $e_b$ but the square wave $e_b$ has its transition points at the peaks of the incoming signal rather than at the crossovers at zero voltage. The voltage $e_b$ therefore leads the voltage $e_a$ by 90° phase. This phase lead maintained for all frequencies in which the forward impedance of the diodes is small compared to the capacitive reactance $X_c$. The bias voltages supplied by sources 273, 274 on the diodes 267, 268, 270 and 271 must be very small compared to the signal voltage $e_5$ so this form of phase shifter-limiter is preferably preceded by a high gain voltage amplifier. However, the class A range of this amplifier cannot be exceeded or the voltage $e_b$ will not have its transitions at the true peak values of the wave $e_5$. Therefore, the input level cannot vary over as wide a range as for the shifters 28, 33 shown in Figure 6 without causing phase errors.

A variable velocity facsimile system is provided in which a bandwidth reduction for a given speed of transmission is obtained. A feature is that the setting of two or more speeds of scanning and of maintaining these same exact settings in the recorder is reduced to a minor problem rather than the major difficult part of the system. No frequency standards are used at either end. If the FM wave end frequencies drift, the exposure time per element changes but no mismatch in synchronism occurs. Crossovers of the FM wave are the only important feature of the wave that can be affected by the transmission line amplitude or phase distortion. Even a large misplacement of one crossover, while changing the density of recording of that image element, would not affect synchronism. Phase and amplitude distortion of the FM signal has to be serious enough to add or subtract to the number of crossovers for it to affect synchronism. The speed of operation can be made variable over a wide range by simply changing the FM frequency limits.

An automatic error detector can be provided with practically no effort and no additional equipment. Assuming that an image of 1000 elements per scanning line is used, the recorder is limited in its travel to say 990 pulses by control of the integrator 38, and so on, where it would stop and remain while the scanner finished the 1000 pulse. If all lines are counted to the same number of matchups, the recorder overexposes its last image element for 10 pulses from the scanner, and produces a definite sharp line of uniform exposure on the margin of the paper. If it tripped on noise, it arrives early and the spot ending the scanning line is too dark. If it failed to trip on a fadeout or loss of signal, it arrives late and the line end would be underexposed.

A system has been described for transmitting and detecting four bits of information per cycle. In practice, any reasonable number of bits such as three or five or six could be provided without altering the principles of operation. Instead of a 90° separation of the bits, a corresponding angular separation is used for the number of bits of information per carrier cycle. Thus, 60° intervals could be taken to give six bits of information per cycle, and so on. The corresponding number of pulse pickups 18 are used, the phase shifters 28, 33 being arranged to provide the voltage outputs $e_a$ and $e_b$ bearing the proper phase relationship. The net effect in any case is equivalent to conventional FM using a carrier frequency high enough to give the same total number of information bits at the rate of two bits per cycle.

The frequency modulation system of the invention has been described as used in a facsimile system. However, the frequency modulation system is not limited to this particular application. The modulating signal applied to the sawtooth oscillator 17 may be supplied from any suitable source. For example, in the case of an audio or similar input signal where wide frequency swings are contemplated, an integrating type of detector may be used on the pulses appearing at the output of rectifiers 31, 32, 36, and 37 to obtain an amplitude varying inversely with frequency for application to a loudspeaker, and so on. A capacitor is connected from ground to a positive source of unidirectional potential through a series resistor so that over short periods of time the voltage increase is linear. Each pulse discharges the capacitor so that it starts recharging from zero again. Where four bits of information per cycle are used, the peak voltage attained during each ¼ cycle then represents the time interval between pulses. Reducing the resistor value so that the charging rate is non-linear but comes well up on the exponential curve will make the average amplitude changes more nearly linear with changes in frequency. Assuming an input signal as given in the curve of Figure 7*a*, an output as indicated by the dotted lines in Figure 7*f* is obtained if linear charging of the capacitor is used. When exponential charging is used, the output indicated by the solid lines is obtained.

An FM signal generator is provided by the invention in which the frequency response to changes in the modulating signal is practically instantaneous. The carrier is generated at the fundamental frequency and may readily be shifted in frequency by ratios as high as 5 or 10 to 1. Geometrical shaping or synthesizing is used to derive a near sine wave output at all frequencies, and the filtering out of harmonics is unnecessary. A phase detection system is provided for use with the FM wave generated having wide and rapid frequency swing that delivers usable signals of full amplitude as, for example, when the carrier has shifts in frequency of only ¼ carrier cycle time duration.

What is claimed is:

1. A frequency modulation system comprising a sawtooth wave generator, means connected to said generator and arranged to frequency modulate said sawtooth wave by a modulating signal, means connected to said generator and responsive to said frequency modulated sawtooth wave to form a symmetrical frequency modulated triangular wave from said sawtooth wave, wave shaping means connected to said last-mentioned means and responsive to said triangular wave to form a frequency modulated near sine wave from said triangular wave, and an output circuit connected to said shaping means and responsive to said sine wave.

2. A frequency modulation system comprising a sawtooth wave generator, means including a source of modulating signals connected to said generator and arranged to frequency modulate said sawtooth wave by said modulating signals, a full-wave rectifier connected to said generator and responsive to said frequency modulated sawtooth wave to form a symmetrical frequency modulated triangular wave from said sawtooth wave, wave shaping means arranged to operate on an amplitude basis connected to said rectifier and responsive to said triangular wave to form a frequency modulated near sine wave from said triangular wave, and an output circuit connected to said shaping means and responsive to said sine wave.

3. A frequency modulation system comprising a current conducting device arranged to be normally conducting, means including a source of modulating signals connected to said device so as to vary the current conduction of said device according to a given parameter of said modulating signals, a storage device connected to said current conducting device so as to be charged at constant current by the current of said current conducting device, the rate of charge of said storage device being determined according to the variation in the current conduction of said current conduction device, discharge means connected to said storage device to discharge said storage device upon said storage device being charged to a given level to cause a frequency modulated sawtooth wave to be produced by said storage device and said current conducting device having a constant amplitude peak-to-peak value, means connected to said storage device and responsive to said sawtooth wave to form a symmetrical frequency modulated triangular wave from said sawtooth wave, wave shaping means connected to said last-mentioned means and responsive to said triangular wave to form a frequency modulated near sine wave from said triangular wave, and an output circuit connected to said shaping means and responsive to said sine wave.

4. A frequency modulation system comprising a current conducting device arranged to be normally conducting, means including a source of modulating signals connected to said device so as to vary the current conduction of said device according to the amplitude of said modulating signals, a capacitor connected to said device so as to be charged at constant current by the current of said device, the rate of charge of said capacitor being determined according to the variation in the current conduction of said device, discharge means connected to said capacitor to discharge said capacitor upon said capacitor being charged to a given level to cause a frequency modulated sawtooth wave to be produced by said capacitor and device having a constant amplitude peak-to-peak value, a full-wave rectifier connected to said capacitor and responsive to said sawtooth wave to form a symmetrical frequency modulated triangular wave from said sawtooth wave, wave shaping means connected to said rectifier and responsive to said triangular wave to form a frequency modulated near sine wave from said triangular wave, and an output circuit connected to said shaping means and responsive to said sine wave.

5. A frequency modulation system as claimed in claim 4 and wherein said discharge means includes a resistive voltage dividing network, a gas discharge tube having a plate connected to a point on said network and to one side of said capacitor, a control grid connected to a second point on said network and a cathode connected to the other side of said capacitor, said tube being made to conduct to discharge said capacitor each time the charge on said capacitor equals the voltage across the portion of said network between said first and second points.

6. A frequency modulation system as claimed in claim 4 and wherein said wave shaping means includes a second current conducting device having an output electrode and an input electrode connected to said rectifier to receive said triangular wave, first and second unidirectional current conducting devices each having a plate and cathode, first and second resistors, means to connect said output electrode through said first and second resistors in series to the plate of said first unidirectional current conducting device and to the cathode of said second unidirectional current conducting device, a resistive voltage dividing network, means to connect the cathode of said first unidirectional current conducting device to one point on said network and to connect the plate of said second unidirectional current conducting device to a second point on said network, and means to connect said output circuit to the junction of said first and second resistors.

7. In combination, a phasing circuit responsive to an input signal applied thereto having a given number of bits of information per cycle to be recovered to produce first and second output signals with an angular difference according to the number of said bits of information per cycle, limiting means connected to said circuit and responsive to said first output signal to form a square wave with accurately spaced transition points from said first output signal, pulse producing means connected to said limiting means and responsive to said square wave to produce a pulse of given polarity for each transition point of said square wave, second limiting means connected to said circuit and responsive to said second output signal to form a second square wave with accurately spaced transition points from said second output signal, second pulse producing means connected to said second limiting means and responsive to said second square wave to produce a pulse of said polarity for each transition point of said second square wave, and means for adding together the pulses produced by said first and second pulse producing means to form a train of pulses such that for each cycle of said input signal a number of pulses occur in said train equal to the number of said bits of information per cycle, the spacing of said pulses in said train representing the information to be recovered.

8. In combination, a phasing circuit responsive to an input signal applied thereto having more than two bits of information per cycle to be recovered to produce first and second output signals with an angular difference according to the number of said bits of information per cycle, limiting means including an amplitude limiter and phase inverter connected to said circuit and responsive to said first output signal to produce both positive and negative forms of a high voltage square wave with accurately spaced transition points from said first output signal, pulse producing means including differentiators and a full-wave rectifier connected to said limiting means and responsive to said positive and negative forms of said square wave to produce a pulse of given polarity for each transition point of said square wave, second limiting means including an amplitude limiter and phase inverter connected to said circuit and responsive to said second output signal to produce both positive and negative forms of a second high voltage square wave from said second output signal, second pulse producing means including differentiators and a full-wave rectifier connected to said second limiting means and responsive to said positive and negative forms of said second square wave to produce a pulse of said polarity for each transition point of said second square wave, and means for adding together the pulses produced by said first and second pulse producing means to form a pulse train such that for each cycle of said input signal a number of pulses occur in said train equal to the number of said bits of information per cycle, the spacing of said pulses in said train representing the information to be recovered.

9. A phase detection system comprising a phasing circuit responsive to an input signal applied thereto having four bits of information per cycle to be recovered to produce first and second output signals having an angular difference of ninety degrees for all frequencies in the band of said input signal, limiting means including an amplitude limiter and phase inverter connected to said circuit and responsive to said first output signal to produce both positive and negative forms of a high voltage square wave from said first output signal, pulse producing means including differentiators and a full wave rectifier connected to said limiting means and responsive to said positive and negative forms of said square wave to produce a pulse of given polarity for each transition point of said square wave, second limiting means including an amplitude limiter and phase inverter connected to said circuit and responsive to said second output signal to produce both positive and negative forms of a second high voltage square wave from said second output signal, second pulse producing means including differentiators and a full wave rectifier connected to said second limiting means and responsive to said positive and negative forms of said second square wave to produce a pulse of said polarity for each transition point of said second square wave, and means for adding together the pulse produced by said first and second pulse producing means to form a pulse train such that four pulses occur in said train for each cycle of said input signal, the spacing of said pulses in said train representing the information to be recovered.

10. A frequency modulation system comprising a sawtooth wave generator, means connected to said generator and arranged to frequency modulate said sawtooth wave by a modulating signal to form a frequency modulated sawtooth wave having a given number of bits of information per cycle, means connected to said generator and responsive to said frequency modulated sawtooth wave to form a symmetrical frequency modulated triangular wave from said sawtooth wave, wave shaping means connected to said last-mentioned means and responsive to said triangular wave to form a frequency modulated sine wave from said triangular wave, a phasing circuit coupled to said wave shaping means and responsive to said sine wave to produce first and second output signals with an angular difference according to said given number of bits of information per cycle of said sine wave, limiting means connected to said circuit and responsive to said first output signal to form a square wave with accurately spaced transition points from said first output signal, pulse producing means connected to said limiting means and responsive to said square wave to produce a pulse of given polarity for each transition point of said square wave, second limiting means connected to said circuit and responsive to said second output signal to form a second square wave with accurately spaced transition points from said second output signal, second pulse producing means connected to said second limiting means and responsive to said second square wave to produce a pulse of said polarity for each transition point of said second square wave, and means for adding together the pulses produced by said first and second pulse producing means to form a train of pulses such that for each cycle of said sine wave a number of pulses occur in said train equal to the number of said bits of information per cycle, the spacing of said pulses in said train representing the information to be recovered, and means connected to said last-mentioned means and responsive to said train of pulses to reproduce said modulating signal.

11. A frequency modulation system comprising a current conducting device arranged to be normally conducting, means including a source of modulating signals connected to said device so as to vary the current conduction of said device according to a given parameter of said modulating signals, a storage device connected to said current conducting device so as to be charged at constant current by the current of said current conducting device, the rate of charge of said storage device being determined according to the variation in the current conduction of said current conduction device, discharge means connected to said storage device to discharge said storage device upon said storage device being charged to a given level to cause a frequency modulated sawtooth wave to be produced by said storage device and said current conducting device having a constant amplitude peak-to-peak value and a given number of bits of information per cycle, means connected to said storage device and responsive to said sawtooth wave to form a symmetrical frequency modulated triangular wave from said sawtooth wave, wave shaping means connected to said last-mentioned means and responsive to said triangular wave to form a frequency modulated near sine wave from said triangular wave, a phasing circuit coupled to said wave shaping means and responsive to said sine wave to produce first and second output signals with an angular difference according to said given number of bits of information per cycle, limiting means including an amplitude limiter and phase inverter connected to said circuit and responsive to said first output signal to produce both positive and negative forms of a high voltage square wave from said first output signal, pulse producing means including differentiators and a full wave rectifier connected to said limiting means and responsive to said positive and negative forms of said square wave to produce a pulse of given polarity for each transition point of said square wave, second limiting means including an amplitude limiter and phase inverter connected to said circuit and responsive to said second output signal to produce both positive and negative forms of a second high voltage square wave from said second output signal, second pulse producing means including differentiators and a full wave rectifier connected to said second limiting means and responsive to said positive and negative forms of said second square wave to produce a pulse of said polarity for each transition point of said second square wave, and means for adding together the pulses produced by said first and second pulse producing means to form a pulse train such that for each cycle of said sine wave a number of pulses occur in said train equal to the number of said bits of information per cycle, the spacing of said pulses in said train representing the information to be recovered, and means connected to said last-mentioned means and responsive to said pulse train to reproduce said modulating signal.

12. A frequency modulation system comprising a current conducting device arranged to be normally conducting, means including a source of modulating signals connected to said device so as to vary the current conduction of said device according to the amplitude of said modulating signals, a capacitor connected to said device so as to be charged at constant current by the current of said device, the rate of charge of said capacitor being determined according to the variation in the current conduction of said device, discharge means connected to said capacitor to discharge said capacitor upon said capacitor being charged to a given level to cause a frequency modulated sawtooth wave to be produced by said capacitor and device having a constant amplitude peak-to-peak value and a given number of bits of information per cycle, a full wave rectifier connected to said capacitor and responsive to said sawtooth wave to form a symmetrical frequency modulated triangular wave from said sawtooth wave, wave shaping means connected to said rectifier and responsive to said triangular wave to form a frequency modulated near sine wave from said triangular wave, a phasing circuit coupled to said wave shaping means and responsive to said sine wave to produce first and second output signals with an angular difference according to said given number of bits of information per cycle, limiting means including an amplitude limiter and phase inverter connected to said circuit and responsive to said first output signal to produce both positive and negative forms of a high voltage square wave from said first output signal, pulse producing means including differentiators and a full wave rectifier connected to said limiting means and responsive to said positive and negative forms of said square wave to produce a pulse of given polarity for each transition point of said square wave, second limiting means including an amplitude limiter and phase inverter connected to said circuit and responsive to said second output signal to produce both positive and negative forms of a second high voltage square wave from said second output signal, second pulse producing means including differentiators and a full wave rectifier connected to said second limiting means and responsive to said positive and negative forms of said second square wave to produce a pulse of said polarity for each transition point of said second square wave, and means for adding together the pulses produced by said first and second pulse producing means to form a pulse train such that for each cycle of said sine wave a number of pulses occur in said train equal to said given number of bits of information per cycle, the spacing of said pulses in said train representing the information to be recovered, and means connected to said last-mentioned means and responsive to said pulse train to reproduce said modulating signals.

13. A frequency modulation system comprising a current conducting device arranged to be normally conducting, means including a source of modulating signals connected to said device so as to vary the current conduction of said device according to the amplitude of said modulation signals, a capacitor connected to said device so as to be charged at constant current by the current of said device, the rate of charge of said capacitor being determined according to the variation in the current conduction of said device such that the rate of charge of said capacitor is changed four times per operating cycle of said capacitor, discharge means connected to said capacitor to discharge said capacitor upon said capacitor being charged to a given level to cause a frequency modulated sawtooth wave to be produced by said capacitor and device having a constant amplitude peak-to-peak value and four bits of information per cycle, a full wave rectifier connected to said capacitor and responsive to said sawtooth wave to form a symmetrical frequency modulated triangular wave from said sawtooth wave, wave shaping means connected to said rectifier and responsive to said triangular wave to form a frequency modulated near sine wave from said triangular wave, a phasing circuit coupled to said wave shaping means and responsive to said sine wave to produce first and second output signals having an angular difference of ninety degrees for all frequencies in said sine wave, limiting means including an amplitude limiter and phase inverter connected to said circuit and responsive to said first output signal to produce both positive and negative forms of a high voltage square wave from said first output signal, pulse producing means including differentiators and a full wave rectifier connected to said limiting means and responsive to said positive and negative forms of said square wave to produce a pulse of given polarity for each transition point of said square wave, second limiting means including an amplitude limiter and phase inverter connected to said circuit and responsive to said second output signal to produce both positive and negative forms of a second high voltage square wave from said second output signal, second pulse producing means including differentiators and a full wave rectifier connected to said second limiting means and responsive to said positive and negative forms of said second square wave to produce a pulse of said given polarity for each transition point of said second square wave, means for adding together the pulses produced by said first and second pulse producing means to form a pulse train such that for each cycle of said sine wave four pulses occur in said train, the spacing of said pulses in said train representing the information to be recovered, and means connected to said last-mentioned means and responsive to said pulse train to reproduce said modulating signals.

14. A frequency modulation system as claimed in claim 13 and wherein said discharge means includes a resistive voltage dividing network, a gas discharge tube having a plate connected to a point on said network and to one side of said capacitor, a control grid connected to a second point on said network and a cathode connected to the other side of said capacitor, said tube being made to conduct to discharge said capacitor each time the charge on said capacitor equals the voltage across the portion of said network between said first and second points.

15. A frequency modulation system as claimed in claim 13 and wherein said wave shaping means includes a second current conducting device having an output electrode and an input electrode connected to said rectifier to receive said triangular wave, first and second unidirectional current conducting devices each having a plate and cathode, first and second resistors, means to connect said output electrode through said first and second resistors in series to the plate of said first unidirectional current conducting device and to the cathode of said second unidirectional current conducting device, a resistive voltage dividing network, means to connect the cathode of said first unidirectional current conducting device to one point on said network and to connect the plate of said second unidirectional current conducting device to a second point on said network, said phasing circuit being coupled to the junction of said first and second resistors.

16. A variable velocity facsimile system comprising means to scan an image to be transmitted by a beam of light, pick-up means positioned in relation to said image to be responsive to the intensity of light reflected from said image to produce a modulating signal varying in amplitude according to the changes in light intensity, a sawtooth wave generator, means connected to said generator and to said pick-up means to frequency modulate said sawtooth wave by said modulating signal to produce at the output of said generator a frequency modulated sawtooth wave, a plurality of pulse producing circuits connected to said generator and triggered by said sawtooth wave to produce a pulse at different angles of each cycle of said sawtooth wave, each one of said pulse producing circuits producing a pulse at the same angle of each cycle of said sawtooth wave so that a number of pulses are produced by said pulse producing circuits for each cycle of said sawtooth wave equal to the number of said pulse producing circuits regardless of the frequency of said sawtooth wave, an integrator coupled to said pulse producing circuits and responsive to the pulses produced thereby to produce an output signal determined according to the spacing between the pulses produced by said pulse producing circuits, means connected to said integrator and to said first-mentioned means and responsive to said output signal to operate said first-mentioned means to cause said beam of light to scan said image at a rate of speed determined according to the spacing between the pulses produced by said pulse producing circuits.

17. A variable velocity facsimile system comprising means to scan an image to be transmitted by a beam of light, phototube pick-up means positioned in relation to said image to be responsive to the intensity of light reflected from said image ot produce a modulating signal varying in amplitude according to the changes in light intensity, a current conducting device arranged to be normally conducting, a storage device connected to said current conducting device so as to be charged at constant current by the current of said current conducting device, means connected to said pick-up means and said current conducting device to vary the current conduction of said current conducting device according to the amplitude of said modulating signal, the rate of charge of said storage device being determined according to the variation in the current conduction of said current conducting device, discharge means connected to said storage device to discharge said storage device upon said storage device being charged to a given level to cause a frequency modulated sawtooth wave to be produced by said storage device and said current conducting device having a constant amplitude peak-to-peak value, a plurality of pulse producing circuits coupled to said storage device and to said current conducting device and triggered by said sawtooth wave to produce a pulse at different angles of each cycle of said sawtooth wave, each one of said pulse producing circuits producing a pulse at the same angle of each cycle of said sawtooth wave so that a number of pulses are produced by said pulse producing circuits for each cycle of said sawtooth wave equal to the number of said pulse producing circuits regardless of the frequency of said sawtooth wave, an integrator coupled to said pulse producing circuits and responsive to the pulses produced thereby to produce an output signal determined according to the spacing between the pulses produced by said pulse producing circuits, means connected to said integrator and to said first-mentioned means to cause said beam of light to scan said image at a rate of speed determined according to the spacing between the pulses produced by said pulse producing circuits.

18. A variable velocity facsimile system as claimed in claim 17 and wherein said storage device is a capacitor, said means to scan said image including a cathode ray tube type of flying spot scanner.

19. A variable velocity facsimile system comprising means to scan an image to be transmitted by a beam of light, pick-up means positioned in relation to said image to be responsive to the intensity of light reflected from said image to produce a modulating signal varying in amplitude according to the changes in light intensity, a sawtooth wave generator, means connected to said generator and to said pick-up means to frequency modulate said sawtooth wave by said modulating signal to produce at the output of said generator a frequency modulated sawtooth wave, a plurality of pulse producing circuits connected to said generator and triggered by said sawtooth wave to produce a pulse at different angles of each cycle of said sawtooth wave, each one of said pulse producing circuits producing a pulse at the same angle of each cycle of said sawtooth wave so that a number of pulses are produced by said pulse producing circuits for each cycle of said sawtooth wave equal to the number of said pulse producing circuits regardless of the frequency of said sawtooth wave, an integrator coupled to said pulse producing circuits and responsive to the pulses produced thereby to produce an output signal determined according to the spacing between the pulses produced by said pulse producing circuits, means connected to said integrator and to said first-mentioned means and responsive to said output signal to operate said first-mentioned means to cause said beam of light to scan said image at a rate of speed determined according to the spacing between the pulses produced by said pulse producing circuits, means connected to said generator and responsive to said sawtooth wave to form a symmetrical frequency modulated triangular wave from said sawtooth wave, wave shaping means connected to said last-mentioned means and responsive to said triangular wave to form a frequency modulated near sine wave from said triangular wave, and an output circuit connected to said shaping means and responsive to said sine wave.

20. A variable velocity facsimile system comprising means to scan an image to be transmitted by a beam of light, phototube pick-up means positioned in relation to said image to be responsive to the intensity of light reflected from said image to produce a modulating signal varying in amplitude according to the changes in light intensity, a current conducting device arranged to be normally conducting, a storage device connected to said current conducting device so as to be charged at constant current by the current of said current conducting device, means connected to said pick-up means and said current conducting device to vary the current conduction of said current conducting device according to the amplitude of said modulating signal, the rate of charge of said storage device being determined according to the variation in the current conduction of said current conducting device, discharge means connected to said storage device to discharge said storage device upon said storage device being charged to a given level to cause a frequency modulated sawtooth wave to be produced by said storage device and said current conducting device having a constant amplitude peak-to-peak value, a plurality of pulse producing circuits coupled to said sawtooth wave to produce a pulse at different angles of each cycle of said sawtooth wave, each one of said pulse producing circuits producing a pulse at the same angle of each cycle of said sawtooth wave so that a number of pulses are produced by said pulse producing circuits for each cycle of said sawtooth wave equal to the number of said pulse producing circuits regardless of the frequency of said sawtooth wave, an integrator coupled to said pulse producing circuits and responsive to the pulses produced thereby to produce an output signal determined according to the spacing between the pulses produced by said pulse producing circuits, means connected to said integrator and to said first-mentioned means and responsive to said output signal to operate said first-mentioned means to cause said beam of light to scan said image at a rate of speed determined according to the spacing between the pulses produced by said pulse producing circuits, a full-wave rectifier connected to said storage device and responsive to said sawtooth wave to form a symmetrical frequency modulated triangular wave from said sawtooth wave, wave shaping means connected to said rectifier and responsive to said triangular wave to form a frequency modulated near sine wave from said triangular wave, and an output circuit connected to said shaping means and responsive to said sine wave.

21. A variable velocity facsimile system as claimed in claim 20 and wherein said wave shaping means includes a second current conducting device having an output electrode and an input electrode connected to said rectifier to receive said triangular wave, first and second unidirectional current conducting devices each having a plate and cathode, first and second resistors, means to connect said output electrode through said first and second resistors in series to the plate of said first unidirectional current conducting device and to the cathode of said second unidirectional current conducting device, a resistive voltage dividing network, means to connect the cathode of said first unidirectional current conducting device to one point on said network and to connect the plate of said second unidirectional current conducting device to a second point on said network, and means to connect said output circuit to the junction of said first and second resistors.

22. A variable velocity facsimile system comprising means to scan an image to be transmitted by a beam of light, pick-up means positioned in relation to said image to be responsive to the intensity of light reflected from said image to produce a modulation signal varying in amplitude according to the changes in light intensity, a sawtooth wave generator, means connected to said generator and to said pick-up means to frequency modulate said sawtooth wave by said modulating signal to produce at the output of said generator a frequency modulated sawtooth wave, a plurality of pulse producing circuits connected to said generator and triggered by said sawtooth wave, each one of said pulse producing circuits producing a pulse at the same angle of each cycle of said sawtooth wave so that a number of pulses are produced by said pulse producing circuits for each cycle of said sawtooth wave equal to the number of said pulse producing circuits regardless of the frequency of said sawtooth wave, an integrator coupled to said pulse producing circuits and responsive to the pulses produced thereby to produce an output signal determined according to the spacing between the pulses produced by said pulse producing circuits, means connected to said integrator and to said first-mentioned means and responsive to said output signal to operate said first-mentioned means to cause said beam of light to scan said image at a rate of speed determined according to the spacing between the pulses produced by said pulse producing circuits, whereby each cycle of said sawtooth wave includes a number of bits of information per cycle equal to the number of said pulse producing circuits, rectifying means connected to said generator and responsive to said sawtooth wave to form a symmetrical frequency modulated triangular wave from said sawtooth wave, wave shaping means connected to said rectifying means and responsive to said triangular wave to form a frequency modulated near sine wave from said triangular wave, a phasing circuit coupled to said wave shaping means and responsive to said sine wave to produce first and second output signals with an angular difference determined according to said number of bits of information per cycle, limiting means connected to said phasing circuit and responsive to said first output signal to form a square wave from said first output signal, pulse producing means connected to said limiting means and responsive to said square wave to produce a pulse of given polarity for each transition of said square wave, a second limiting means connected to said phasing circuit and responsive to said second output signal to form a second square wave from said second output signal, second pulse producing means connected to said second limiting means and responsive to said second square wave to produce a pulse of said polarity for each transition of said second square wave, means connected to said first and second pulse producing means to add together the pulses produced thereby to produce a train of pulses such that for each cycle of said sine wave a number of pulses occur in said pulse train equal to said number of bits of information per cycle, the spacing of the pulses in said pulse train being determined according to said bits of information, and means connected to said last-mentioned means and responsive to said pulse train to reproduce said image.

23. A variable velocity facsimile system comprising means to scan an image to be transmitted by a beam of light, phototube pick-up means positioned in relation to said image to be responsive to the intensity of light reflected from said image to produce a modulating signal varying in amplitude according to the changes in light intensity, a current conducting device arranged to be normally conducting, a storage device connected to said current conducting device so as to be charged at constant current by the current of said current conducting device, means connected to said pick-up means and said current conducting device to vary the current conduction of said current conducting device according to the amplitude of said modulating signal, the rate of charge of said storage device being determined according to the variation in the current conduction of said current conducting device, discharge means connected to said storage device to discharge said storage device upon said storage device being charged to a given level to cause a frequency modulated sawtooth wave to be produced by said storage device and said current conducting device having a constant amplitude peak-to-peak value, a plurality of pulse producing circuits coupled to said storage device and to said current conducting device and triggered by said sawtooth wave to produce a pulse at different angles of each cycle of said sawtooth wave, each one of said pulse producing circuits producing a pulse at the same angle of each cycle of said sawtooth wave so that a number of pulses are produced by said pulse producing circuits for each cycle of said sawtooth wave equal to the number of said pulse producing circuits regardless of the frequency of said sawtooth wave, an integrator coupled to said pulse producing circuits and responsive to the pulses produced thereby to produce an output signal determined according to the spacing between the pulses produced by said pulse producing circuits, means connected to said integrator and to said first-mentioned means and responsive to said output signal to operate said first-mentioned means to cause said beam of light to scan said image at a rate of speed determined according to the spacing between the pulses produced by said pulse producing circuits, whereby each cycle of said sawtooth wave includes a number of bits of information per cycle equal to the number of said pulse producing circuits, rectifying means connected to said generator and responsive to said sawtooth wave to form a symmetrical frequency modulated triangular wave from said sawtooth wave, wave shaping means connected to said rectifying means and responsive to said triangular wave to form a frequency modulated near sine wave from said triangular wave, a phasing circuit coupled to said wave shaping means and responsive to said sine wave to produce first and second output signals with an angular difference determined according to said number of bits of information per cycle, limiting means connected to said phasing circuit and responsive to said first output signal to form a square wave from said first output signal, pulse producing means connected to said limiting means and responsive to said square wave to produce a pulse of given polarity for each transition of said square wave, a second limiting means connected to said phasing circuit and responsive to said second output signal to form a second square wave from said second output signal, second pulse producing means connected to said second limiting means and responsive to said second square wave to produce a pulse of said polarity for each transition of said second square wave, means connected to said first and second pulse producing means to add together the pulses produced thereby to produce a train of pulses such that for each cycle of said sine wave a number of pulses occur in said pulse train equal to said number of bits of information per cycle, the spacing of the pulses in said pulse train being determined according to said bits of information, and means connected to said last-mentioned means and responsive to said pulse train to reproduce said image.

24. A variable velocity facsimile system comprising a flying spot scanner arranged to scan line-by-line an image to be transmitted by a beam of light, phototube pick-up means positioned in relation to said image to be responsive to the intensity of light reflected from said image to produce a modulating signal varying in amplitude according to the changes in light intensity, a current conducting device arranged to be normally conducting, a capacitor connected to said device so as to be charged at constant current by the current of said device, means connected to said pick-up means and said device to vary the current conduction of said device according to the amplitude of said modulating signal, the rate of charge of said capacitor being determined according to the variation in the current conduction of said device, discharge means connected to said capacitor to discharge said capacitor upon said capacitor being charged to a given level to cause a frequency modulated sawtooth wave to be produced by said capacitor and device having a constant amplitude peak-to-peak value, first, second, third and fourth pulse producing circuits connected to said capacitor and triggered by said sawtooth wave to produce a pulse at each ninety degree angle of each cycle of said sawtooth wave, each one of said pulse producing circuits producing a pulse at the same angle of each cycle of said sawtooth wave so that four pulses are produced by said pulse producing circuits for each cycle of said sawtooth wave, an integrator coupled to said pulse producing circuits and responsive to the pulses produced thereby to produce a step wave output signal in which the height of the steps is constant and the width of the steps is determined according to the spacing between the pulses applied thereto, means including an amplifier connected to said integrator and said scanner and responsive to said step wave output signal to operate said scanner to cause said beam of light to scan each line of said image in equal steps at a rate of speed determined according to the width of the steps of said step wave output signal, whereby each cycle of said sawtooth wave includes four bits of information, said integrator being arranged to produce a fly-back pulse for each end of a scanned line of said image, means connected to said integrator and said device and responsive to said fly-back pulse to move said image to the next scanning line and to modulate said sawtooth wave by said fly-back pulse, a full-wave rectifier connected to said capacitor and responsive to said sawtooth wave to form a symmetrical frequency modulated triangular wave from said sawtooth wave, wave shaping means connected to said rectifier and responsive to said triangular wave to form a modulated near sine wave from said triangular wave, a phasing circuit coupled to said wave shaping means and responsive to said sine wave to produce first and second output signals having a ninety degree phase difference, limiting means including an amplitude limiter and a phase inverter connected to said phasing circuit and responsive to said first output signal to form both positive and negative forms of a square wave from said first output signal, pulse producing means including differentiators and a full-wave rectifier connected to said limiting means and responsive to both forms of said square wave to produce a pulse of given polarity at each transition of said square wave, second limiting means including an amplitude limiter and phase inverter connected to said phasing circuit and responsive to said second output signal to form both positive and negative forms of a second square wave from said second output signal, second pulse producing means including differentiators and a full-wave rectifier connected to said second limiting means and responsive to both forms of said second square wave to produce a pulse of said polarity at each transition of said second square wave, resistive means connected to said first and second pulse producing means to add together the pulses produced thereby to form a pulse train such that for each cycle of said sine wave four pulses occur in said pulse train spaced according to said bits of information, a light sensitive paper, a flying spot recorder arranged to scan said paper by a beam of light, a second integrator connected to said resistive means and responsive to said pulse train to produce step wave output signals similar to the step wave output signals produced by said first integrator, means connected to second integrator and said recorder and responsive to the step wave output signal produced by said second integrator to operate said recorder to scan each line of said paper in said equal steps and at a rate of speed determined according to said width of the steps, detection means coupled to said wave shaping means and arranged to produce a control pulse upon detecting the occurrence of said fly-back pulse in said sine wave, and means connected to said detection means and said integrator and responsive to said control pulse to control the operation of said second integrator and to move said paper to the next scanning line, whereby the operation of said recorder is synchronized with that of said scanner.

25. A variable velocity facsimile system as claimed in claim 24 and wherein said discharge means includes a resistive voltage dividing network, a gas discharge tube having a plate connected to a point on said network and to one side of said capacitor, a control grid connected to a second point on said network and a cathode connected to the other side of said capacitor, said tube being made to conduct to discharge said capacitor each time the charge on said capacitor equals the voltage across the portion of said network between said first and second points.

26. A variable velocity facsimile system as claimed in claim 24 and wherein said wave shaping means includes a second current conducting device having an output electrode and an input electrode connected to said first-mentioned rectifier to receive said triangular wave, first and second unidirectional current conducting devices each having a plate and cathode, first and second resistors, means to connect said output electrode through said first and second resistors in series to the plate of said first unidirectional current conducting device and to the cathode of said second unidirectional current conducting device, a resistive voltage dividing network, means to connect the cathode of said first unidirectional current conducting device to one point on said network and to connect the plate of said second unidirectional current conducting device to a second point on said network, said phasing circuit being coupled to the junction of said first and second resistors.

27. A phase shifting circuit comprising a transformer having an output winding center-tapped to ground and an input winding to which a signal is applied, a first network including a resistor and capacitor series-connected across said output winding and having a phase lag of ninety degrees at the center frequency of the frequency band of said signal, a second network including a series tuned inductance-capacitance circuit and a second resistor series-connected across said output winding and having a one hundred and eighty degree lag at said center frequency, whereby a signal appears at the junction of said first resistor and said capacitor ninety degrees out of phase with respect to a signal appearing at the junction of said series-tuned circuit and said second resistor.

28. A variable velocity facsimile system as claimed in claim 16 and wherein said integrator includes means responsive to the pulses produced by said pulse producing circuits to produce a step-wave output signal in which the height of the steps is constant and the width of the steps is determined according to the spacing between the pulses applied thereto.

29. A variable velocity facsimile system as claimed in claim 16 and wherein said means to scan an image includes a cathode ray tube type of flying spot scanner, said means connected to said integrator and to said first-mentioned means being responsive to said output signal to control the horizontal deflection in said tube.

30. A variable velocity facsimile system as claimed in claim 16 and wherein said means to scan an image is arranged to scan said image line by line, said integrator including means for producing a flyback pulse following the scanning of each line of said image by said first-mentioned means, and means connected between said integrator and said sawtooth wave generator for amplitude modulating said sawtooth wave by said flyback pulse.

No references cited.